(12) United States Patent
Furuta

(10) Patent No.: US 11,945,275 B2
(45) Date of Patent: Apr. 2, 2024

(54) DAMPING CONTROL DEVICE AND DAMPING CONTROL METHOD FOR VEHICLE

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 486 days.

(21) Appl. No.: 17/331,205

(22) Filed: May 26, 2021

(65) Prior Publication Data

US 2021/0387497 A1 Dec. 16, 2021

(30) Foreign Application Priority Data

Jun. 10, 2020 (JP) ................................. 2020-101021

(51) Int. Cl.
*B60G 17/0165* (2006.01)
*B60G 17/018* (2006.01)
(Continued)

(52) U.S. Cl.
CPC ....... *B60G 17/0165* (2013.01); *B60G 17/018* (2013.01); *B60G 17/06* (2013.01); *B60G 17/08* (2013.01); *B60G 2400/102* (2013.01); *B60G 2400/202* (2013.01); *B60G 2400/252* (2013.01); *B60G 2400/821* (2013.01); (Continued)

(58) Field of Classification Search
CPC .. B60G 17/0165; B60G 17/018; B60G 17/06; B60G 17/08; B60G 2400/91; B60G 2400/102; B60G 2400/202; B60G 2400/252; B60G 2400/821; (Continued)

(56) References Cited

U.S. PATENT DOCUMENTS

| | | | |
|---|---|---|---|
| 11,814,036 B2 * | 11/2023 | Furuta | ................... B60W 30/02 |
| 2004/0094912 A1 * | 5/2004 | Niwa | ................. B60G 17/0165 |
| | | | 280/5.518 |

(Continued)

FOREIGN PATENT DOCUMENTS

| | | | | |
|---|---|---|---|---|
| DE | 102012009882 A1 * | 11/2013 | ......... | B60G 17/0165 |
| DE | 102012009882 A1 | 11/2013 | | |

(Continued)

*Primary Examiner* — John M Zaleskas
(74) *Attorney, Agent, or Firm* — Dinsmore & Shohl LLP

(57) ABSTRACT

A damping control device includes a control force generating device and a controller. The controller is configured to acquire road surface displacement related values related to a plurality of road surface displacements in a predetermined sampling zone, acquire an amplitude index indicating a magnitude of an amplitude of the sampled values, determine an operation delay period of the control force generating device based on the magnitude of the amplitude indicated by the amplitude index, calculate target control force for reducing vibration of a vehicle body based on the road surface displacement related values at a predicted passing position where a wheel is predicted to pass after an elapse of the operation delay period from a current time, and transmit, to the control force generating device, a control command for causing the control force generating device to regulate the control force to agree with the target control force.

10 Claims, 12 Drawing Sheets

(51) Int. Cl.
*B60G 17/06* (2006.01)
*B60G 17/08* (2006.01)

(52) U.S. Cl.
CPC ...... *B60G 2400/91* (2013.01); *B60G 2500/10* (2013.01); *B60G 2600/12* (2013.01); *B60G 2800/162* (2013.01); *B60G 2800/916* (2013.01)

(58) Field of Classification Search
CPC ............ B60G 2500/10; B60G 2600/12; B60G 2800/162; B60G 2800/916
See application file for complete search history.

(56) References Cited

U.S. PATENT DOCUMENTS

| | | | | |
|---|---|---|---|---|
| 2010/0138108 A1* | 6/2010 | Kajino | ................. | B60G 17/016 701/38 |
| 2010/0324780 A1* | 12/2010 | Koumura | ........... | B60G 17/0182 701/38 |
| 2011/0160960 A1* | 6/2011 | Kajino | ................. | B60G 17/025 701/38 |
| 2013/0103259 A1* | 4/2013 | Eng | .................... | B60G 17/0165 701/37 |
| 2014/0001717 A1* | 1/2014 | Giovanardi | ........ | B60G 17/0165 280/5.518 |
| 2014/0222287 A1* | 8/2014 | Popham | ............. | B60G 17/0165 701/37 |
| 2014/0353934 A1* | 12/2014 | Yabumoto | ........... | B60G 17/018 280/5.515 |
| 2017/0100980 A1* | 4/2017 | Tsuda | ................ | B60G 17/0165 |
| 2017/0326937 A1* | 11/2017 | Miska | ................ | B60G 17/0165 |
| 2018/0154723 A1* | 6/2018 | Anderson | ............. | H02K 11/33 |
| 2018/0326810 A1* | 11/2018 | Masamura | ......... | B60G 17/0165 |
| 2019/0023094 A1* | 1/2019 | Panagis | ................ | B60G 17/019 |
| 2019/0126713 A1* | 5/2019 | Miska | .................... | B60G 17/02 |
| 2019/0168563 A1* | 6/2019 | Bärecke | ................. | B60G 17/08 |
| 2021/0276566 A1* | 9/2021 | Furuta | ................... | B60W 10/20 |
| 2021/0283972 A1* | 9/2021 | Coerman | ........... | B60G 17/0165 |
| 2021/0331545 A1* | 10/2021 | Furuta | .................... | B60G 15/00 |
| 2021/0331548 A1* | 10/2021 | Lee | ..................... | B60G 17/0165 |
| 2021/0379953 A1* | 12/2021 | Furuta | ................ | B60G 17/0165 |
| 2021/0379955 A1* | 12/2021 | Furuta | ................ | B60G 17/0165 |
| 2021/0379956 A1* | 12/2021 | Furuta | .................... | B60G 17/06 |
| 2021/0387498 A1* | 12/2021 | Furuta | .................... | B60G 17/06 |
| 2021/0402840 A1* | 12/2021 | Furuta | ................ | B60G 17/0157 |
| 2021/0402841 A1* | 12/2021 | Furuta | .................... | B60G 17/08 |
| 2022/0105770 A1* | 4/2022 | Furuta | .................... | B60G 17/06 |
| 2022/0105771 A1* | 4/2022 | Furuta | .................. | B60G 17/018 |
| 2022/0105774 A1* | 4/2022 | Furuta | .................. | B60G 21/055 |
| 2022/0111695 A1* | 4/2022 | Furuta | .................... | B60G 17/06 |
| 2022/0134832 A1* | 5/2022 | Furuta | ................ | B60G 17/0165 701/37 |
| 2022/0134833 A1* | 5/2022 | Furuta | .................... | B60G 17/06 701/37 |
| 2022/0135021 A1* | 5/2022 | Furuta | ................ | B60G 17/0165 701/41 |
| 2022/0185292 A1* | 6/2022 | Furuta | .................... | B60W 40/06 |

FOREIGN PATENT DOCUMENTS

| | | | | |
|---|---|---|---|---|
| DE | 102014223475 A1 | | 5/2016 | |
| DE | 102015202405 A1 | * | 8/2016 | |
| JP | H04020809 U | | 2/1992 | |
| JP | 05319066 A | * | 12/1993 | |
| JP | H07215032 A | | 8/1995 | |
| JP | 2001-047835 A | | 2/2001 | |
| JP | 2009-096366 A | | 5/2009 | |
| JP | 2009132237 A | * | 6/2009 | ........ B60G 17/0157 |
| JP | 2009269483 A | * | 11/2009 | |
| JP | 2011152838 A | * | 8/2011 | |
| JP | 2016-107778 A | | 6/2016 | |
| JP | 2020026187 A | * | 2/2020 | ........... H01J 27/022 |

* cited by examiner

DAMPING CONTROL DEVICE AND DAMPING CONTROL METHOD FOR VEHICLE

CROSS-REFERENCE TO RELATED APPLICATION

This application claims priority to Japanese Patent Application No. 2020-101021 filed on Jun. 10, 2020, incorporated herein by reference in its entirety.

BACKGROUND

1. Technical Field

The present disclosure relates to a damping control device and a damping control method for a vehicle. The damping control device is used to, for example, perform preview damping control for controlling a control force generating device to generate control force that agrees with "target control force calculated based on road surface displacement related values at predicted passing position of wheel" at a timing when the wheel passes through the predicted passing position.

2. Description of Related Art

There is known a damping control device for a vehicle, which is configured to perform preview damping control for generating control force for damping a vehicle body based on conditions of a road surface ahead of a current contact position of wheels. For example, a damping control device described in Japanese Unexamined Utility Model Registration Application Publication No. 4-20809 (JP 4-20809 U) transmits, when a projection is detected ahead of a vehicle, a command signal to a control force generating device within a period shorter by an operation delay period of the control force generating device than a period from the detection of the projection to passage of wheels by the projection. The control force generating device generates control force in a vertical direction between the wheels and a vehicle body.

SUMMARY

An actual operation delay period changes depending on the magnitude of control force (target control force) to be generated when the wheels pass by the projection. In general, the operation delay period of the control force generating device increases as the magnitude of the target control force increases. In some control force generating devices (for example, a linear motor), the operation delay period increases as the magnitude of the target control force decreases. Since the operation delay period changes depending on the magnitude of the target control force, the damping control device described above presets the operation delay period to a certain constant value. Therefore, there is a possibility that target control force necessary for the projection cannot be generated when the wheels pass by the projection. In this case, there is a possibility that vibration of the vehicle body due to the projection cannot be reduced appropriately.

To improve driving comfort, there is a demand to continuously reduce vibration of the vehicle body that is caused by conditions of a road surface by continuously controlling the control force generating device based on the conditions of the road surface. To meet the demand, research has been conducted into the following damping control device (hereinafter referred to as "researched device").

The researched device acquires "road surface displacement related values related to road surface displacements that are vertical displacements of road surface" at a predicted passing position where wheels are expected to pass after an elapse of "preset constant operation delay period" from a current time. The researched device calculates target control force for damping a sprung portion based on the road surface displacement related values, and transmits a control command for causing a control force generating device to generate vertical control force that agrees with the target control force between the wheels and a vehicle body.

Since the operation delay period is set to the constant value, there is a possibility that the control force generating device cannot generate the control force that agrees with the target control force at a timing when the wheels pass through the predicted passing position. It is therefore desirable to predict and determine the operation delay period, but there is room for improvement about how to predict an accurate operation delay period.

The present disclosure provides a damping control device for a vehicle, in which an accurate operation delay period is predicted to increase a possibility that a control force generating device can generate control force that agrees with target control force for a predicted passing position at a timing when a wheel passes through the predicted passing position, thereby appropriately reducing vibration of a sprung portion.

A first aspect of the present disclosure relates to a damping control device. The damping control device includes a control force generating device and a controller. The control force generating device is configured to generate control force in a vertical direction between at least one wheel suspended from a vehicle body of a vehicle and the vehicle body. The controller is configured to reduce, by controlling the control force generating device to change the control force, vibration of the vehicle body that is caused by vibration occurring in the wheel in response to vertical road surface displacements while the vehicle is traveling. The controller is configured to acquire, as sampled values, road surface displacement related values that are values related to the road surface displacements in a predetermined sampling zone, acquire an amplitude index indicating a magnitude of an amplitude of the sampled values, determine an operation delay period of the control force generating device based on the magnitude of the amplitude indicated by the amplitude index, calculate target control force for reducing the vibration of the vehicle body based on the road surface displacement related values at a predicted passing position where the wheel is predicted to pass after an elapse of the operation delay period from a current time, and transmit, to the control force generating device, a control command for causing the control force generating device to regulate the control force to agree with the target control force.

When the magnitude of the amplitude of the road surface displacement related values in the sampling zone (that is, the amplitude of the sampled values) is large, there is a strong possibility that undulations of a road surface in the sampling zone increase. When the magnitude of the amplitude is small, there is a strong possibility that the road surface in the sampling zone is flat. Therefore, there is a strong possibility that the target control force increases when the magnitude of the amplitude is large. Thus, there is a strong possibility that the operation delay period increases or decreases depending on a characteristic of the control force generating device. According to the first aspect, the operation delay period is determined based on the magnitude of the amplitude of the sampled values. Thus, the operation delay period can be determined more accurately based on the magnitude of the amplitude to increase the possibility that the control force generating device can generate the target control force at a timing when the wheel passes through the predicted passing position. Accordingly, the vibration of the vehicle body can be reduced appropriately.

In the first aspect, the controller may be configured to determine a local maximum value and a local minimum value of the sampled values, define sets of the local maximum value and the local minimum value preceding or succeeding the local maximum value, calculate an absolute value of a difference between the local maximum value and the local minimum value in each of the sets, determine one of the sets having a largest absolute value of the difference, and acquire the absolute value of the difference as the amplitude index.

According to the configuration described above, it is possible to calculate an amplitude index indicating the magnitude of the amplitude of the sampled values more accurately. Thus, the operation delay period can be determined more accurately based on the magnitude of the amplitude to increase the possibility that the control force generating device can generate the target control force at the timing when the wheel passes through the predicted passing position. Accordingly, the vibration of the vehicle body can be reduced appropriately.

In the first aspect, the controller may be configured to acquire an average of the sampled values as the amplitude index.

According to the configuration described above, it is possible to calculate an amplitude index indicating the magnitude of the amplitude of the sampled values more accurately. Thus, the operation delay period can be determined more accurately based on the magnitude of the amplitude to increase the possibility that the control force generating device can generate the target control force at the timing when the wheel passes through the predicted passing position. Accordingly, the vibration of the vehicle body can be reduced appropriately.

In the first aspect, the controller may be configured to acquire the amplitude index based on the sampled values in a predetermined frequency band. The frequency band may be set to a preset frequency band in which vibration of a sprung portion is reducible by causing the control force generating device to generate the control force.

Since the amplitude index is calculated based on the road surface displacement related values at the frequency at which the vibration of the vehicle body can be reduced by the control force generating device, the operation delay period can be determined more accurately. According to the configuration described above, it is possible to increase the possibility that the control force generating device can generate the target control force at the timing when the wheel passes through the predicted passing position. Accordingly, the vibration of the vehicle body can be reduced appropriately.

In the first aspect, the controller may be configured to determine the operation delay period to increase as the magnitude of the amplitude indicated by the amplitude index increases.

According to the configuration described above, the operation delay period can be determined more accurately when the control force generating device has a characteristic that the operation delay period increases as the target control force increases, thereby increasing the possibility that the control force generating device can generate the target control force at the timing when the wheel passes through the predicted passing position. Accordingly, the vibration of the vehicle body can be reduced appropriately.

In the first aspect, the controller may be configured to acquire a first amplitude index indicating a magnitude of an amplitude of the sampled values in a predetermined first frequency band, acquire a second amplitude index indicating a magnitude of an amplitude of the sampled values in a predetermined second frequency band having a minimum frequency equal to or higher than a maximum frequency of the first frequency band, and determine the operation delay period to increase as the magnitude of the amplitude indicated by the first amplitude index and the magnitude of the amplitude indicated by the second amplitude index increase. An increase amount of the operation delay period that increases depending on the second amplitude index may be set larger than an increase amount of the operation delay period that increases depending on the first amplitude index.

When the magnitude of the amplitude of the sampled values in the second frequency band is large, the possibility that the operation delay period increases because the road surface displacements of the road surface in the sampling zone greatly change and the magnitude of the target control force increases is stronger than the possibility when the magnitude of the amplitude in the first frequency band is large. According to the configuration described above, the operation delay period can be determined more accurately because the increase amount of the operation delay period that increases depending on the second amplitude index is larger than the increase amount of the operation delay period that increases depending on the first amplitude index. Thus, it is possible to increase the possibility that the control force generating device can generate the target control force at the timing when the wheel passes through the predicted passing position. Accordingly, the vibration of the vehicle body can be reduced appropriately.

In the first aspect, the controller may be configured to determine the operation delay period to decrease as the magnitude of the amplitude indicated by the amplitude index increases.

The operation delay period can be determined more accurately when the control force generating device has a characteristic that the operation delay period decreases as the target control force increases (that is, the control force generating device has a characteristic that the operation delay period increases as the target control force decreases), thereby increasing the possibility that the control force generating device can generate the target control force at the timing when the wheel passes through the predicted passing position. Accordingly, the vibration of the vehicle body can be reduced appropriately.

In the first aspect, the controller may be configured to acquire a first amplitude index indicating a magnitude of an amplitude of the sampled values in a predetermined first frequency band, acquire a second amplitude index indicating a magnitude of an amplitude of the sampled values in a predetermined second frequency band having a minimum frequency equal to or higher than a maximum frequency of the first frequency band, and determine the operation delay period to decrease as the magnitude of the amplitude indicated by the first amplitude index and the magnitude of the amplitude indicated by the second amplitude index increase. A decrease amount of the operation delay period that decreases depending on the second amplitude index may be set larger than a decrease amount of the operation delay period that decreases depending on the first amplitude index.

According to the configuration described above, the operation delay period can be determined more accurately because the decrease amount of the operation delay period that decreases depending on the second amplitude index is larger than the decrease amount of the operation delay period that decreases depending on the first amplitude index. Thus, it is possible to increase the possibility that the control force generating device can generate the target control force at the timing when the wheel passes through the predicted passing position. Accordingly, the vibration of the vehicle body can be reduced appropriately.

A second aspect of the present disclosure relates to a damping control method for a vehicle configured to reduce, by controlling a control force generating device to change control force in a vertical direction, vibration of a vehicle body of the vehicle that is caused by vibration occurring in at least one wheel suspended from the vehicle body in response to vertical road surface displacements while the vehicle is traveling. The control force generating device is configured to generate the control force between the wheel and the vehicle body. The damping control method includes acquiring, as sampled values, road surface displacement related values that are values related to the road surface displacements in a predetermined sampling zone, acquiring an amplitude index indicating a magnitude of an amplitude of the sampled values, determining an operation delay period of the control force generating device based on the magnitude of the amplitude indicated by the amplitude index, calculating target control force for reducing the vibration of the vehicle body based on the road surface displacement related values at a predicted passing position where the wheel is predicted to pass after an elapse of the operation delay period from a current time, and transmitting, to the control force generating device, a control command for causing the control force generating device to regulate the control force to agree with the target control force.

According to the second aspect, the operation delay period is determined based on the magnitude of the amplitude of the road surface displacement related values in the sampling zone (that is, the amplitude of the sampled values). Thus, the operation delay period can be determined more accurately based on the magnitude of the amplitude to increase the possibility that the control force generating device can generate the target control force at the timing when the wheel passes through the predicted passing position. Accordingly, the vibration of the vehicle body can be reduced appropriately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Structure

A damping control device for a vehicle according to an embodiment of the present disclosure (hereinafter referred to as "this control device") is applied to a vehicle 10 illustrated in FIG. 1. As illustrated in FIG. 2, this control device is "damping control device 20".

Figure 1:
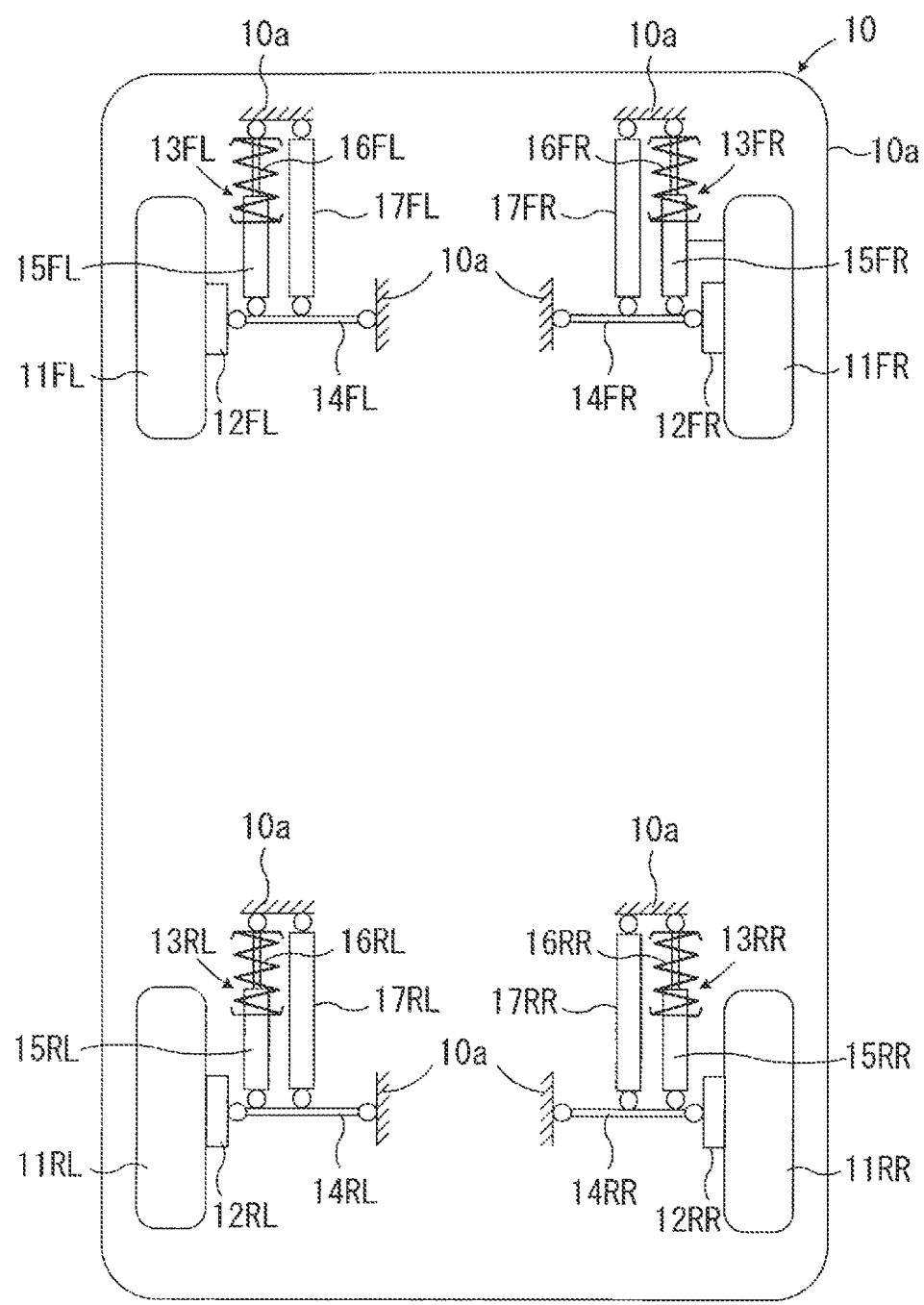
FIG. 1 is a schematic structural diagram of a vehicle to which a preview damping control device according to an embodiment of the present disclosure (hereinafter referred to as "this control device") is applied.
Figure 2:
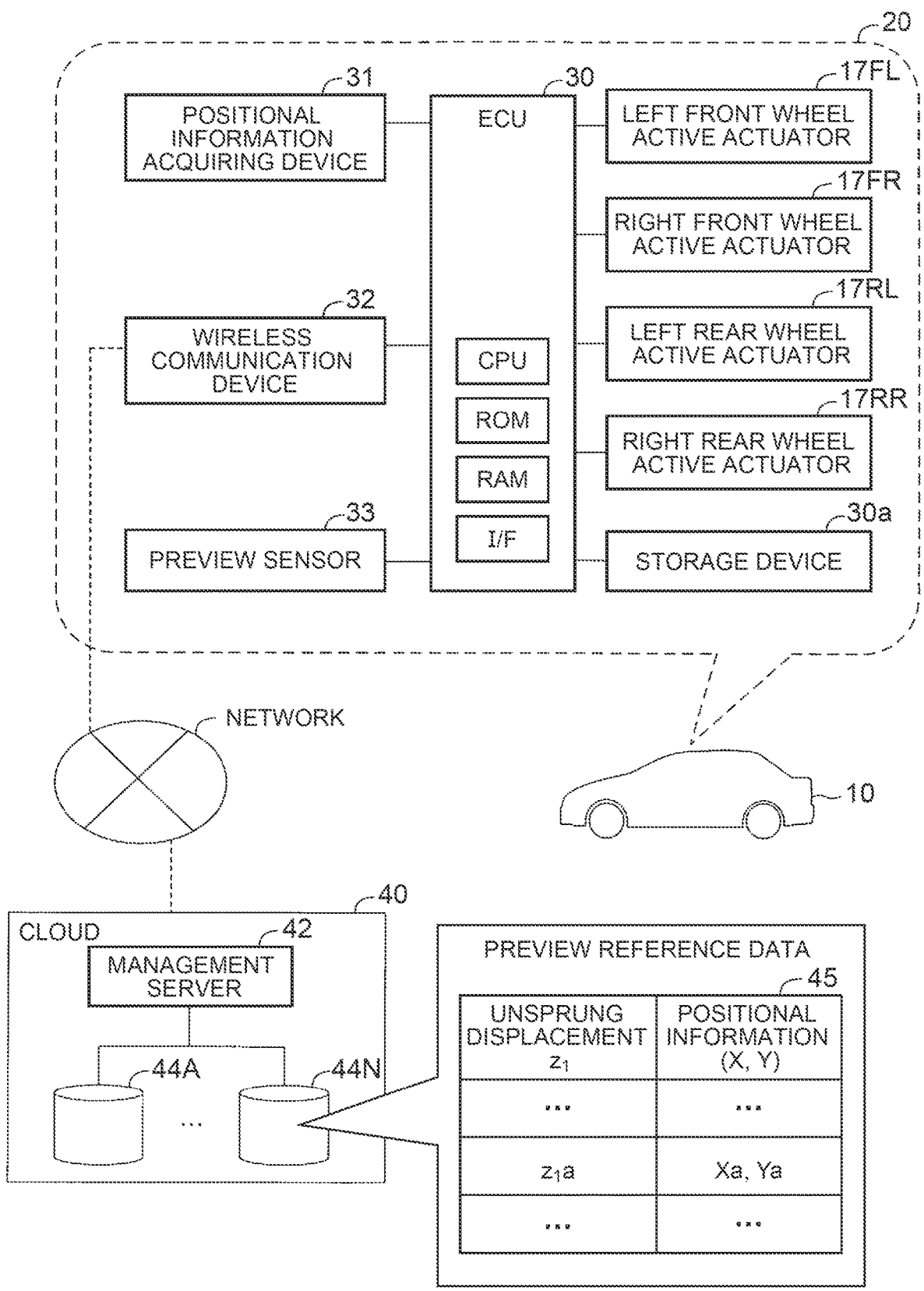
FIG. 2 is a schematic structural diagram of this control device.

As illustrated in FIG. 1, the vehicle 10 includes a right front wheel 11FR, a left front wheel 11FL, a right rear wheel 11RR, and a left rear wheel 11RL. The right front wheel 11FR is rotatably supported on a vehicle body 10a by a wheel support member 12FR. The left front wheel 11FL is rotatably supported on the vehicle body 10a by a wheel support member 12FL. The right rear wheel 11RR is rotatably supported on the vehicle body 10a by a wheel support member 12RR. The left rear wheel 11RL is rotatably supported on the vehicle body 10a by a wheel support member 12RL.

The right front wheel 11FR, the left front wheel 11FL, the right rear wheel 11RR, and the left rear wheel 11RL are referred to as "wheels 11" unless otherwise distinguished. Similarly, the right front wheel 11FR and the left front wheel 11FL are referred to as "front wheels 11F". Similarly, the right rear wheel 11RR and the left rear wheel 11RL are referred to as "rear wheels 11R". The wheel support members 12FR to 12RL are referred to as "wheel support members 12".

The vehicle 10 further includes a right front wheel suspension 13FR, a left front wheel suspension 13FL, a right rear wheel suspension 13RR, and a left rear wheel suspension 13RL. The suspensions 13FR to 13RL are independent suspensions, but other types of suspension may be employed. Details of the suspensions 13FR to 13RL are described below.

The right front wheel suspension 13FR suspends the right front wheel 11FR from the vehicle body 10a, and includes a suspension arm 14FR, a shock absorber 15FR, and a suspension spring 16FR. The left front wheel suspension 13FL suspends the left front wheel 11FL from the vehicle body 10a, and includes a suspension arm 14FL, a shock absorber 15FL, and a suspension spring 16FL.

The right rear wheel suspension 13RR suspends the right rear wheel 11RR from the vehicle body 10a, and includes a suspension arm 14RR, a shock absorber 15RR, and a suspension spring 16RR. The left rear wheel suspension 13RL suspends the left rear wheel 11RL from the vehicle body 10a, and includes a suspension arm 14RL, a shock absorber 15RL, and a suspension spring 16RL.

The right front wheel suspension 13FR, the left front wheel suspension 13FL, the right rear wheel suspension 13RR, and the left rear wheel suspension 13RL are referred to as "suspensions 13" unless otherwise distinguished. Similarly, the suspension arms 14FR to 14RL are referred to as "suspension arms 14". Similarly, the shock absorbers 15FR to 15RL are referred to as "shock absorbers 15". Similarly, the suspension springs 16FR to 16RL are referred to as "suspension springs 16".

The suspension arm 14 couples the wheel support member 12 to the vehicle body 10a. In FIG. 1, one suspension arm 14 is illustrated for one suspension 13, but a plurality of suspension arms 14 may be provided for one suspension 13.

The shock absorber 15 is arranged between the vehicle body 10a and the suspension arm 14, coupled to the vehicle body 10a at the upper end, and coupled to the suspension arm 14 at the lower end. The suspension spring 16 is resiliently mounted between the vehicle body 10a and the suspension arm 14 via the shock absorber 15. That is, the upper end of the suspension spring 16 is coupled to the vehicle body 10a, and the lower end of the suspension spring 16 is coupled to a cylinder of the shock absorber 15. In this resilient mounting structure of the suspension spring 16, the shock absorber 15 may be arranged between the vehicle body 10a and the wheel support member 12.

In this example, the shock absorber 15 is a non-adjustable shock absorber, but may be an adjustable shock absorber. The suspension spring 16 may resiliently be mounted between the vehicle body 10a and the suspension arm 14 without intervention of the shock absorber 15. That is, the upper end of the suspension spring 16 may be coupled to the vehicle body 10a, and the lower end of the suspension spring 16 may be coupled to the suspension arm 14. In this resilient mounting structure of the suspension spring 16, the shock absorber 15 and the suspension spring 16 may be arranged between the vehicle body 10a and the wheel support member 12.

Regarding the members such as the wheel 11 and the shock absorber 15 of the vehicle 10, a portion close to the wheel 11 with respect to the suspension spring 16 is referred to as "unsprung portion 50 or unsprung member 50 (see FIG. 3)". Regarding the members such as the vehicle body 10a and the shock absorber 15 of the vehicle 10, a portion close to the vehicle body 10a with respect to the suspension spring 16 is referred to as "sprung portion 51 or sprung member 51 (see FIG. 3)".

A right front wheel active actuator 17FR, a left front wheel active actuator 17FL, a right rear wheel active actuator 17RR, and a left rear wheel active actuator 17RL are provided between the vehicle body 10a and the suspension arms 14FR to 14RL, respectively. The active actuators 17FR to 17RL are provided in parallel to the shock absorbers 15FR to 15RL and the suspension springs 16FR to 16RL, respectively.

The right front wheel active actuator 17FR, the left front wheel active actuator 17FL, the right rear wheel active actuator 17RR, and the left rear wheel active actuator 17RL are referred to as "active actuators 17" unless otherwise distinguished. Similarly, the right front wheel active actuator 17FR and the left front wheel active actuator 17FL are referred to as "front wheel active actuators 17F". Similarly, the right rear wheel active actuator 17RR and the left rear wheel active actuator 17RL are referred to as "rear wheel active actuators 17R".

The active actuator 17 generates control force Fc based on a control command from an electronic control unit 30 illustrated in FIG. 2. The control force Fc is vertical force acting between the vehicle body 10a and the wheel 11 (that is, between the sprung portion 51 and the unsprung portion 50) to damp the sprung portion 51. In the active actuator 17 of this embodiment, a period required to generate control force Fc that agrees with target control force Fct that is a target value of the control force Fc (operation delay period) increases as the magnitude of the target control force Fct increases. The electronic control unit 30 is referred to as "ECU 30", and may be referred to as "control unit 30 or controller 30". The active actuator 17 may be referred to as "a control force generating device 17". The active actuator 17 is an electromagnetic active suspension. The active actuator 17 serves as the active suspension in cooperation with, for example, the shock absorber 15 and the suspension spring 16.

As illustrated in FIG. 2, the damping control device 20 includes a storage device 30a, a positional information acquiring device 31, a wireless communication device 32, and a preview sensor 33 in addition to the ECU 30. The damping control device 20 further includes the active actuators 17FR to 17RL.

The ECU 30 includes a microcomputer. The microcomputer includes a CPU, a read-only memory (ROM), a random-access memory (RAM), and an interface (I/F). The CPU executes instructions (programs or routines) stored in the ROM to implement various functions.

The ECU 30 is connected to the non-volatile storage device 30a in which information is readable and writable. In this example, the storage device 30a is a hard disk drive. The ECU 30 can store (save) information in the storage device 30a, and can read information stored (saved) in the storage device 30a. The storage device 30a is not limited to the hard disk drive, and may be any storage device or storage medium in which information is readable and writable.

The ECU 30 is connected to the positional information acquiring device 31, the wireless communication device 32, and the preview sensor 33.

The positional information acquiring device 31 includes a global navigation satellite system (GNSS) receiver and a map database. The GNSS receiver receives "signal from artificial satellite (for example, GNSS signal)" for detecting a position of the vehicle 10 at a current time (current position). The map database stores road map information and the like. The positional information acquiring device 31 acquires the current position (for example, latitude and longitude) of the vehicle 10 based on the GNSS signal. Examples of the positional information acquiring device 31 include a navigation device.

The ECU 30 determines "traveling direction Td of vehicle 10" at a current time based on records of current positions acquired by the positional information acquiring device 31. The GNSS signal contains a moving speed, and the ECU 30 determines "vehicle speed V1 of vehicle 10" at a current time based on the moving speed contained in the GNSS signal.

The wireless communication device 32 is a wireless communication terminal for communicating information with a cloud 40 via a network. The cloud 40 includes "management server 42 and plurality of storage devices 44A to 44N" connected to the network. The one or more storage devices 44A to 44N are referred to as "storage devices 44" unless otherwise distinguished.

The management server 42 includes a CPU, a ROM, a RAM, and an interface (I/F). The management server 42 retrieves and reads data stored in the storage device 44, and writes data into the storage device 44.

The storage device 44 stores preview reference data 45. An unsprung displacement $z_1$ and positional information acquired when at least one of the vehicle 10 and other vehicles (hereinafter referred to as "collecting vehicle") has actually traveled on a road surface are registered in the preview reference data 45 while being linked to (associated with) each other. In other words, the collecting vehicle transmits a position of the wheel 11 of the traveling vehicle and an unsprung displacement $z_1$ at the position of the wheel 11 to the management server 42 in association with each other, and the management server 42 stores the position and the unsprung displacement $z_1$ in the storage device 44 as the preview reference data 45.

The unsprung displacement $z_1$ is a vertical displacement of the unsprung portion 50 (see FIG. 3) that vibrates in the vertical direction in response to vertical displacements of a road surface (road surface displacements) when the collecting vehicle travels along the road surface. The unsprung displacement $z_1$ is a value related to the road surface displacements. The positional information is "information indicating position (for example, latitude and longitude) of wheel 11 where unsprung displacement $z_1$ is acquired" at a time when the unsprung displacement $z_1$ is acquired. The position of the wheel 11 is calculated based on a position of the vehicle 10 and a traveling direction Td of the vehicle. FIG. 2 illustrates an unsprung displacement "$z_1a$" and positional information "Xa, Ya" as examples of "unsprung displacement $z_1$ and positional information" registered as the preview reference data 45.

The preview sensor 33 may be an arbitrary preview sensor in this technical field as long as a value indicating a vertical displacement of a road surface ahead of the vehicle 10 (referred to as "road surface displacement $z_0$") can be acquired like, for example, a camera sensor, a Light Detection and Ranging (LIDAR) sensor, and a radar. The preview sensor 33 is used in a modified example described later.

The ECU 30 is connected to the right front wheel active actuator 17FR, the left front wheel active actuator 17FL, the right rear wheel active actuator 17RR, and the left rear wheel active actuator 17RL via drive circuits (not illustrated).

The ECU 30 calculates target control force Fct for damping the sprung portion 51 based on an unsprung displacement $z_1$ at a predicted passing position of each wheel 11 described later, and controls the active actuator 17 to generate control force Fc that corresponds to (agrees with) the target control force Fct when each wheel 11 passes through the predicted passing position.

Overview of Basic Preview Damping Control

Figure 3:
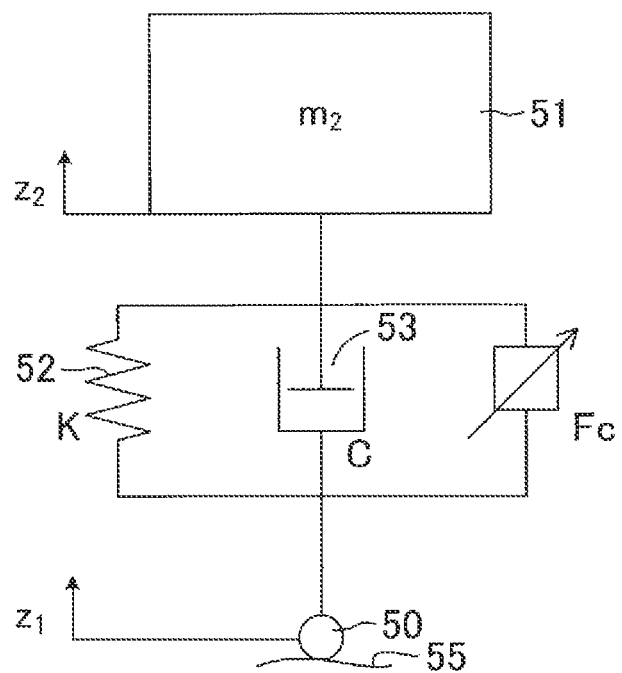
FIG. 3 is a diagram illustrating a single-wheel model of a vehicle.

An overview of basic preview damping control to be executed by the damping control device 20 is described below. FIG. 3 illustrates a single-wheel model of the vehicle 10 on a road surface 55.

A spring 52 corresponds to the suspension spring 16. A damper 53 corresponds to the shock absorber 15. An actuator 54 corresponds to the active actuator 17.

In FIG. 3, a mass of the sprung portion 51 is referred to as "sprung mass $m_2$". A vertical displacement of the unsprung portion 50 is referred to as "unsprung displacement $z_1$". A vertical displacement of the sprung portion 51 is referred to as "sprung displacement $z_2$". The sprung displacement $z_2$ is a vertical displacement of the sprung portion 51 associated with a position of each wheel 11. A spring rate (equivalent spring rate) of the spring 52 is referred to as "spring rate K". A damping coefficient (equivalent damping coefficient) of the damper 53 is referred to as "damping coefficient C". Force generated by the actuator 54 is referred to as "control force Fc".

Time derivatives of $z_1$ and $z_2$ are represented by "$dz_1$" and "$dz_2$", respectively. Second-order time derivatives of $z_1$ and $z_2$ are represented by "$ddz_1$" and "$ddz_2$", respectively. In the following description, an upward displacement of each of $z_1$ and $z_2$ is defined to be positive, and upward force generated by each of the spring 52, the damper 53, and the actuator 54 is defined to be positive.

In the single-wheel model of the vehicle 10 illustrated in FIG. 3, the sprung portion 51 (vehicle body 10a) vibrates because vertical vibration occurring in the unsprung portion 50 (wheel 11) in response to the road surface displacement $z_0$ is transmitted via the suspension 13. An equation of motion regarding a vertical motion of the sprung portion 51 can be represented by Expression (1).

$$m_2 ddz_2 = C(dz_1 - dz_2) + K(z_1 - z_2) - Fc \tag{1}$$

In Expression (1), the damping coefficient C is assumed to be constant. However, an actual damping coefficient changes depending on a stroke speed of the suspension 13. Therefore, the damping coefficient C may be set to, for example, a value that changes depending on a time derivative of a stroke H.

When the vibration of the sprung portion 51 is completely canceled out by the control force Fc (that is, when the sprung acceleration $ddz_2$, the sprung speed $dz_2$, and the sprung displacement $z_2$ are "0"), the control force Fc is represented by Expression (2).

$$Fc = Cdz_1 + Kz_1 \tag{2}$$

Thus, control force Fc for damping the vibration of the sprung portion 51 can be represented by Expression (3) by setting a control gain to α. The control gain α is an arbitrary constant larger than 0 and equal to or smaller than 1.

$$Fc = \alpha(Cdz_1 + Kz_1) \tag{3}$$

When Expression (3) is applied to Expression (1), Expression (1) can be represented by Expression (4).

$$m_2 ddz_2 = C(dz_1 - dz_2) + K(z_1 - z_2) - \alpha(Cdz_1 + Kz_1) \tag{4}$$

Expression (5) is obtained when Expression (4) is subjected to Laplace transform and the resultant expression is rearranged. That is, a transfer function from the unsprung displacement $z_1$ to the sprung displacement $z_2$ is represented by Expression (5). In Expression (5), "s" represents a Laplace operator.

$$\frac{z_2}{z_1} = \frac{(1-\alpha)(Cs + K)}{m_2 s^2 + Cs + K} \tag{5}$$

According to Expression (5), the transfer function changes depending on α. When α is an arbitrary value larger than 0 and equal to or smaller than 1, it is observed that the magnitude of the transfer function is securely smaller than "1" (that is, the vibration of the sprung portion 51 can be reduced). When a is 1, the magnitude of the transfer function is "0". Therefore, it is observed that the vibration of the sprung portion 51 is completely canceled out. The target control force Fct can be represented by Expression (6) based on Expression (3). In Expression (6), a gain (31 corresponds to αC, and a gain β$_2$ corresponds to αK.

$$Fct=\beta_1 \times dz_1 + \beta_2 \times z_1 \qquad (6)$$

Thus, the ECU 30 calculates the target control force Fct by acquiring in advance (previewing) an unsprung displacement z$_1$ at a position where the wheel 11 passes in the future (predicted passing position), and applying the acquired unsprung displacement z$_1$ to Expression (6). The ECU 30 causes the actuator 54 to generate control force Fc corresponding to the target control force Fct at a timing when the wheel 11 passes through the predicted passing position (that is, at a timing when the unsprung displacement z$_1$ applied to Expression (6) occurs). With this configuration, the vibration of the sprung portion 51 can be reduced when the wheel 11 passes through the predicted passing position (that is, when the unsprung displacement z$_1$ applied to Expression (6) occurs).

The target control force Fct may be calculated based on Expression (7) obtained by omitting the derivative term (β$_1$×dz$_1$) from Expression (6). Also in this case, the control force Fc (=β$_2$×z$_1$) for reducing the vibration of the sprung portion 51 is generated from the actuator 54. Therefore, the vibration of the sprung portion 51 can be reduced as compared to a case where the control force Fc is not generated.

$$Fct=\beta_2 \times z_1 \qquad (7)$$

Figure 4:
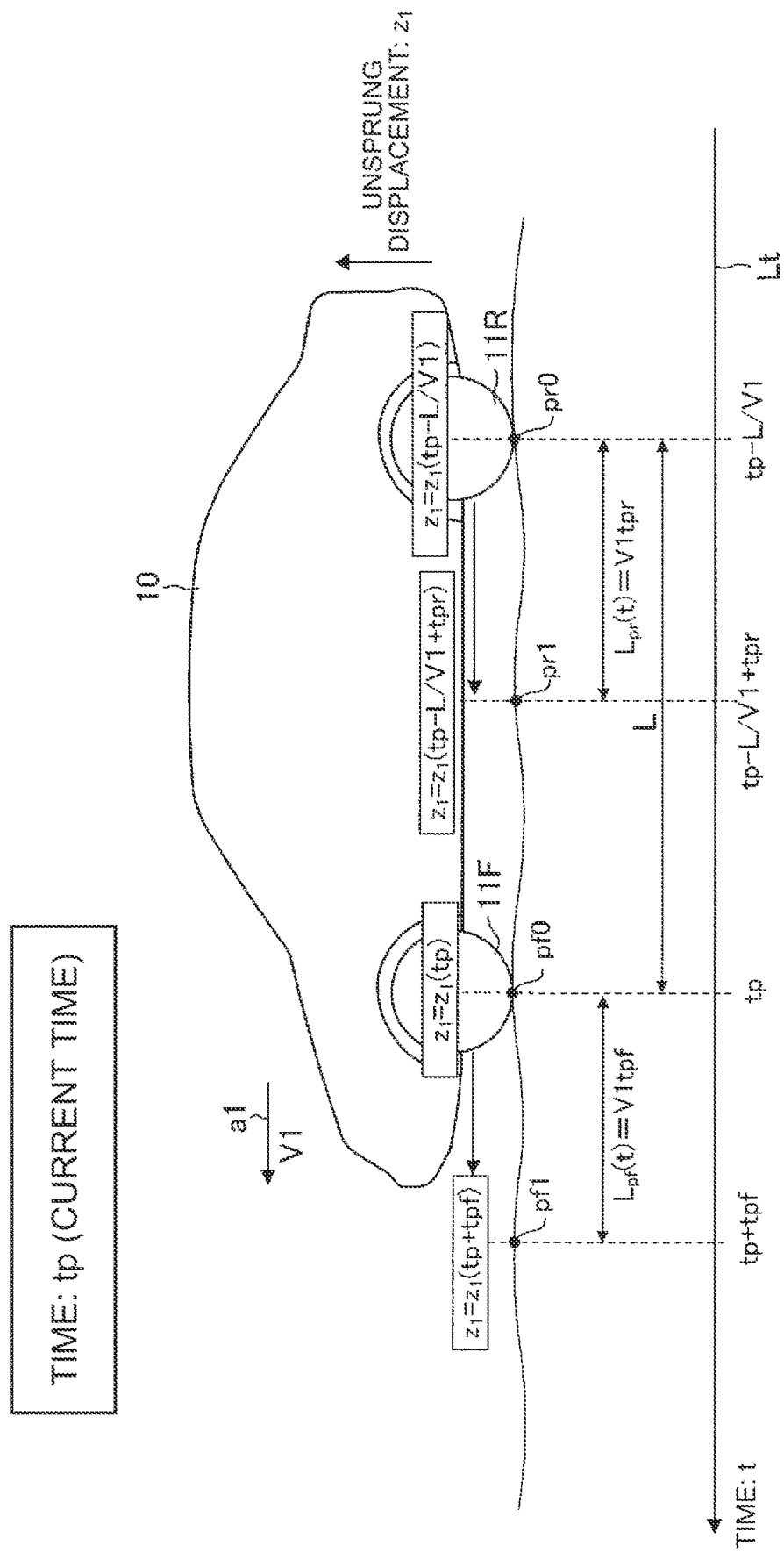
FIG. 4 is a diagram for describing preview damping control.

An example of the operation of the damping control device 20 is described below with reference to FIG. 4 to FIG. 6. FIG. 4 illustrates the vehicle 10 traveling at a vehicle speed V1 in a direction indicated by an arrow a1 at a current time tp. In the following description, the front wheel 11F and the rear wheel 11R are right or left wheels, and the moving speeds of the front wheel 11F and the rear wheel 11R are equal to the vehicle speed V1.

In FIG. 4, a line Lt is a virtual time axis t. Unsprung displacements z$_1$ of the front wheel 11F on a movement path at current, past, and future times t are represented by a function z$_1$(t) of the times t. Thus, an unsprung displacement z$_1$ of the front wheel 11F at a position (contact position) pf0 at the current time tp is represented by z$_1$(tp). An unsprung displacement z$_1$ of the rear wheel 11R at a position pr0 at the current time tp corresponds to an unsprung displacement z$_1$ of the front wheel 11F at a time "tp−L/V1" earlier than the current time tp by "period (L/V1) required for front wheel 11F to move by wheelbase L". Thus, the unsprung displacement z$_1$ of the rear wheel 11R at the current time tp is represented by z$_1$(tp−L/V1).

First, preview damping control for the front wheel 11F is described. The ECU 30 determines a predicted passing position pf1 of the front wheel 11F at a time later (in the future) than the current time tp by a front wheel operation delay period tpf. The front wheel operation delay period tpf is a period required from the timing when the ECU 30 determines the predicted passing position pf1 to the timing when the front wheel active actuator 17F outputs control force Fcf that agrees with target control force Fcft. The front wheel operation delay period tpf is determined based on an amplitude index Va described later.

The predicted passing position pf1 of the front wheel 11F is a position spaced away from the position pf0 at the current time tp by a front wheel preview distance L$_{pf}$ (=V1×tpf) along a front wheel predicted movement path where the front wheel 11F is predicted to move. As described later in detail, the position pf0 is calculated based on a current position of the vehicle 10 that is acquired by the positional information acquiring device 31.

The ECU 30 acquires in advance a part of the preview reference data 45 in an area near the current position of the vehicle 10 (preparatory zone described later) from the cloud 40. The ECU 30 acquires an unsprung displacement z$_1$(tp+tpf) based on the determined predicted passing position pf1 and the part of the preview reference data 45 acquired in advance.

The ECU 30 may acquire the unsprung displacement z$_1$(tp+tpf) as follows. First, the ECU 30 transmits the determined predicted passing position pf1 to the cloud 40. The cloud 40 acquires the unsprung displacement z$_1$(tp+tpf) linked to positional information indicating the predicted passing position pf1 based on the predicted passing position pf1 and the preview reference data 45. The cloud 40 transmits the unsprung displacement z$_1$(tp+tpf) to the ECU 30.

The ECU 30 calculates target control force Fcft (=β$_f$×z$_1$(tp+tpf)) by applying the unsprung displacement z$_1$(tp+tpf) to the unsprung displacement z$_1$ in Expression (8).

$$Fcft=\beta_f \times z_1 \qquad (8)$$

The ECU 30 transmits a control command containing the target control force Fcft to the front wheel active actuator 17F to cause the front wheel active actuator 17F to generate control force Fcf that corresponds to (agrees with) the target control force Fcft.

Figure 5:
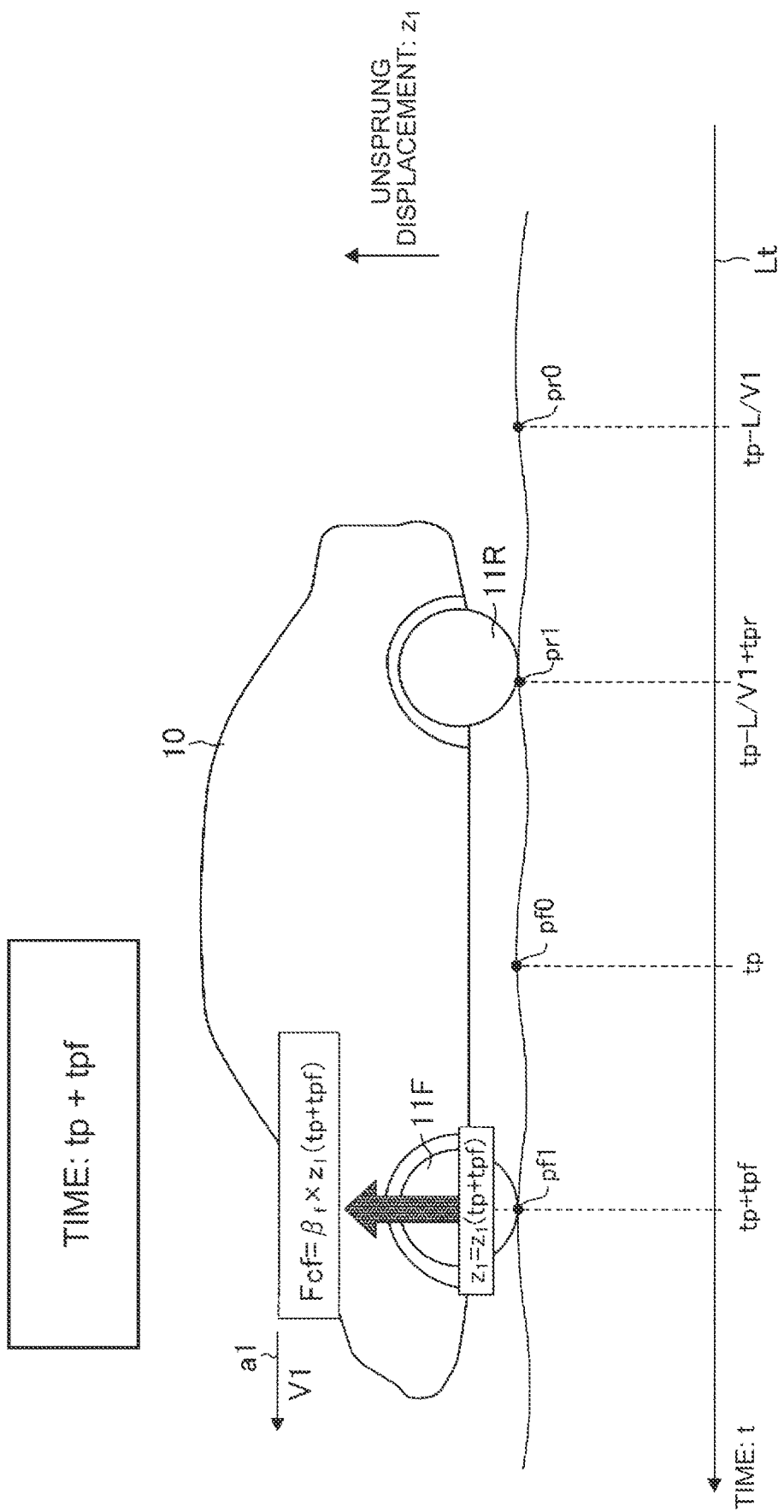
FIG. 5 is a diagram for describing the preview damping control.

As illustrated in FIG. 5, the front wheel active actuator 17F generates the control force Fcf corresponding to the target control force Fcft at "time tp+tpf" (that is, at a timing when the front wheel 11F actually passes through the predicted passing position pf1) later than the current time tp by the front wheel operation delay period tpf. Thus, the front wheel active actuator 17F can generate, at an appropriate timing, the control force Fcf for appropriately damping the vibration of the sprung portion 51 that occurs due to the unsprung displacement z$_1$ of the front wheel 11F at the predicted passing position pf1.

Next, preview damping control for the rear wheel 11R is described. The ECU 30 determines a predicted passing position pr1 of the rear wheel 11R at a time later (in the future) than the current time tp by a rear wheel operation delay period tpr. The rear wheel operation delay period tpr is a period required from the timing when the ECU 30 determines the predicted passing position pr1 to the timing when the rear wheel active actuator 17R outputs control force Fcr that agrees with target control force Fcrt. The rear wheel operation delay period tpr is determined based on the amplitude index Va described later.

If the front wheel active actuator 17F and the rear wheel active actuator 17R are different, the front wheel operation delay period tpf and the rear wheel operation delay period tpr are preset to different values. If the front wheel active actuator 17F and the rear wheel active actuator 17R are the same, the front wheel operation delay period tpf and the rear wheel operation delay period tpr are preset to the same value.

The ECU 30 determines, as the predicted passing position pr1, a position spaced away from the position pr0 at the current time tp by a rear wheel preview distance L$_{pr}$ (=V1× tpr) along a predicted movement path of the rear wheel 11R under the assumption that the rear wheel 11R moves along the same path as that of the front wheel 11F. As described later in detail, the position pr0 is calculated based on the current position of the vehicle 10 that is acquired by the positional information acquiring device 31.

An unsprung displacement z$_1$ at the predicted passing position pr1 can be represented by z$_1$(tp−L/V1+tpr) because this unsprung displacement z$_1$ occurs at a time later than "time (tp−L/V1) when front wheel 11F was located at position pr0 of rear wheel 11R at current time" by the rear wheel operation delay period tpr.

The ECU 30 acquires the unsprung displacement $z_1$(tp−L/V1+tpr) based on the determined predicted passing position pr1 and the part of the preview reference data 45 acquired in advance.

The ECU 30 may acquire the unsprung displacement $z_1$(tp−L/V1+tpr) as follows. First, the ECU 30 transmits the determined predicted passing position pr1 to the cloud 40. The cloud 40 acquires the unsprung displacement $z_1$(tp−L/V1+tpr) linked to positional information indicating the predicted passing position pr1 based on the predicted passing position pr1 and the preview reference data 45. The cloud 40 transmits the unsprung displacement $z_1$(tp−L/V1+tpr) to the ECU 30.

The ECU 30 calculates target control force Fcrt ($=\beta_r \times z_1$(tp−L/V1+tpr)) by applying the unsprung displacement $z_1$(tp−L/V1+tpr) to the unsprung displacement $z_1$ in Expression (9). The gain $\beta_f$ in Expression (8) and the gain $\beta_r$ in Expression (9) are set to different values. This is because a spring rate Kf of the right front wheel suspension 13FR and the left front wheel suspension 13FL differs from a spring rate Kr of the right rear wheel suspension 13RR and the left rear wheel suspension 13RL. When the gains $\beta_f$ and $\beta_r$ are not distinguished, the gains $\beta_f$ and $\beta_r$ may be referred to as "gains $\beta$".

$$Fcrt = \beta_r \times z_1 \quad (9)$$

The ECU 30 transmits a control command containing the target control force Fcrt to the rear wheel active actuator 17R to cause the rear wheel active actuator 17R to generate control force Fcr that corresponds to (agrees with) the target control force Fcrt.

Figure 6:
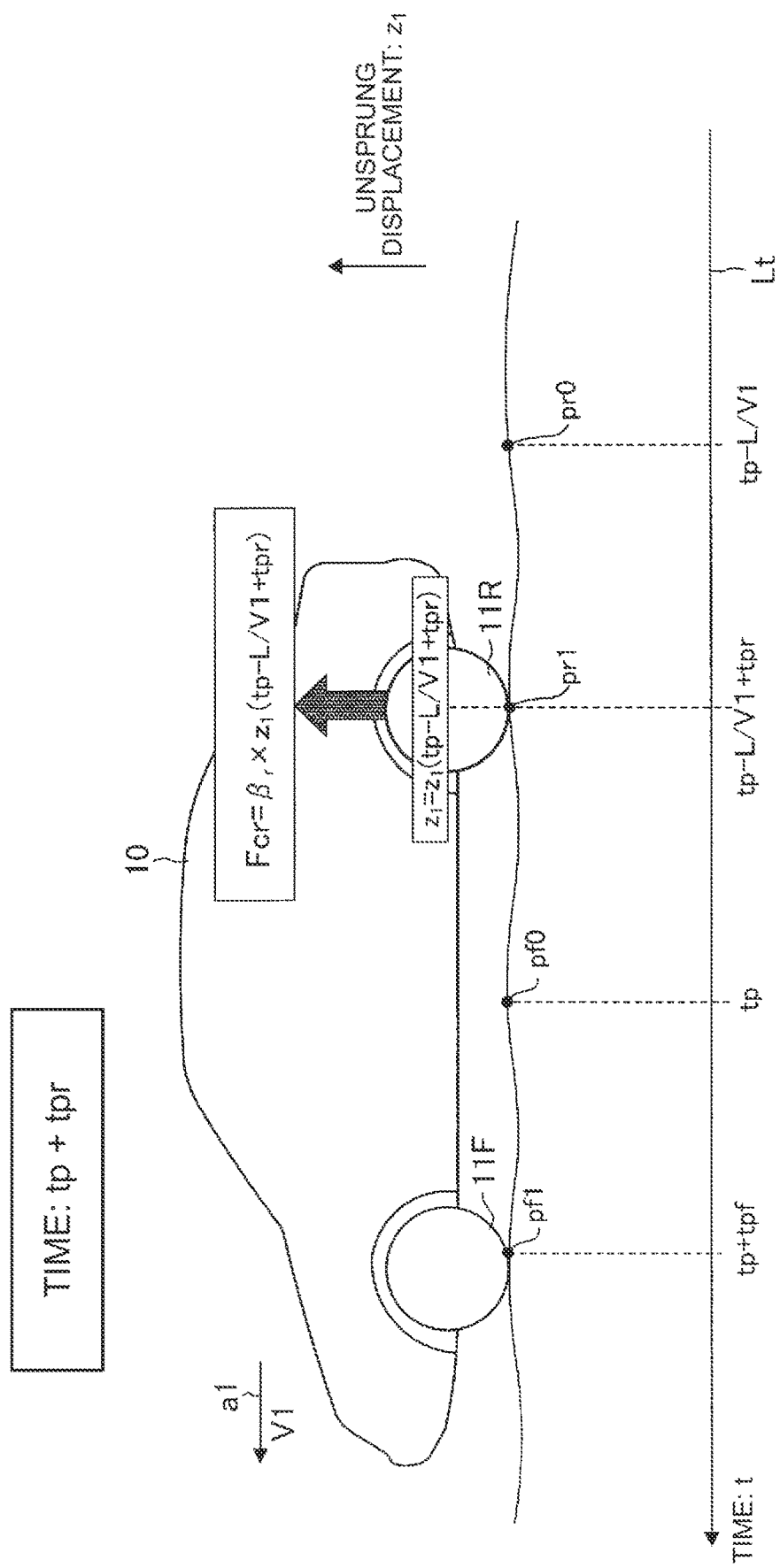
FIG. 6 is a diagram for describing the preview damping control.

As illustrated in FIG. 6, the rear wheel active actuator 17R generates the control force Fcr corresponding to the target control force Fcrt at "time tp+tpr" (that is, at a timing when the rear wheel 11R actually passes through the predicted passing position pr1) later than the current time tp by the rear wheel operation delay period tpr. Thus, the rear wheel active actuator 17R can generate, at an appropriate timing, the control force Fcr for appropriately damping the vibration of the sprung portion 51 that occurs due to the unsprung displacement $z_1$ of the rear wheel 11R at the predicted passing position pr1.

The control described above is damping control for the sprung portion 51, which is referred to as "preview damping control".

Overview of Operations

An overview of operations of the damping control device 20 is described below. The ECU 30 of the damping control device 20 acquires unsprung displacements $z_1$ at a plurality of positions in a front wheel sampling zone Ssmp as front wheel sampled displacements $z_1$smp from the preview reference data 45 stored in the RAM. For example, the front wheel sampling zone Ssmp is a zone having a predetermined distance on a road surface ahead of a contact position of the front wheel 11F. The ECU 30 calculates a front wheel amplitude index Vaf indicating the magnitude of an amplitude of the front wheel sampled displacements $z_1$smp. The ECU 30 determines a front wheel operation delay period tpf by applying the front wheel amplitude index Vaf to a front wheel operation delay period map MAPtpf(Vaf) illustrated in FIG. 7.

The front wheel operation delay period map MAPtpf(Vaf) is prestored in the ROM of the ECU 30, and defines a relationship between the front wheel operation delay period tpf and the front wheel amplitude index Vaf. According to the front wheel operation delay period map MAPtpf(Vaf) illustrated in FIG. 7, the relationship between the front wheel operation delay period tpf and the front wheel amplitude index Vaf is defined so that the front wheel operation delay period tpf increases as the front wheel amplitude index Vaf increases.

The front wheel amplitude index Vaf indicates that the magnitude of the amplitude in the front wheel sampling zone Ssmp increases as the value of the front wheel amplitude index Vaf increases. As the magnitude of the amplitude in the front wheel sampling zone Ssmp increases, undulations of a road surface in the front wheel sampling zone Ssmp increase, thereby increasing a possibility that the target control force Fcft increases. Therefore, the front wheel operation delay period tpf is defined to increase as the magnitude of the amplitude in the front wheel sampling zone Ssmp increases.

When the front wheel operation delay period tpf is determined as described above, the ECU 30 calculates a front wheel preview distance $L_p f$ by multiplying the front wheel operation delay period tpf and a vehicle speed V1 at a current time together. The ECU 30 acquires, from the preview reference data 45, an unsprung displacement $z_1$ at "position where front wheel 11F is predicted to pass after elapse of front wheel operation delay period tpf from current time (predicted passing position pf1)", calculates target control force Fcft based on the unsprung displacement $z_1$, and transmits a control command containing the target control force Fcft to the front wheel active actuator 17F.

The target control force Fcrt of the rear wheel 11R is calculated similarly to the target control force Fcft of the front wheel 11F. The ECU 30 acquires unsprung displacements $z_1$ at a plurality of positions in a rear wheel sampling zone Ssmp as rear wheel sampled displacements $z_1$smp, and calculates a rear wheel amplitude index Var based on the rear wheel sampled displacements $z_1$smp. The ECU 30 determines a rear wheel operation delay period tpr by applying the rear wheel amplitude index Var to a rear wheel operation delay period map MAPtpr(Var) illustrated in FIG. 8. According to the rear wheel operation delay period map MAPtpr(Var) illustrated in FIG. 8, the rear wheel operation delay period tpr is defined to increase as the rear wheel amplitude index Var increases. The ECU 30 calculates target control force Fcrt based on an unsprung displacement $z_1$ at "position where rear wheel 11R is predicted to pass after elapse of rear wheel operation delay period tpr from current time (predicted passing position pr1)", and transmits a control command containing the target control force Fcrt to the rear wheel active actuator 17R.

The front wheel sampling zone Ssmp and the rear wheel sampling zone Ssmp are referred to as "sampling zones Ssmp" unless otherwise distinguished. Similarly, the front wheel sampled displacements $z_1$smp and the rear wheel sampled displacements $z_1$smp are referred to as "sampled displacements $z_1$smp". Similarly, the front wheel amplitude index Vaf and the rear wheel amplitude index Var are referred to as "amplitude indices Va". Similarly, the front wheel operation delay period map MAPtpf(Vaf) and the rear wheel operation delay period map MAPtpr(Var) are referred to as "operation delay period maps MAPtp(Va)". Similarly, the front wheel operation delay period tpf and the rear wheel operation delay period tpr are referred to as "operation delay periods tp".

As understood from the above, a longer operation delay period tp is determined as the magnitude of the amplitude of the sampled displacements $z_1$smp increases. When the possibility of the increase in the operation delay period tp is strong due to an increase in the target control force Fct, the ECU 30 transmits a control command at an earlier timing considering the possibility. Thus, the ECU 30 can predict a more accurate operation delay period tp, and cause the control force generating device 17 to generate control force Fc that agrees with the target control force Fct based on the unsprung displacement $z_1$ at the predicted passing position at a timing when the wheel 11 passes through the predicted passing position. Accordingly, the vibration of the sprung portion 51 can be reduced appropriately.

Specific Operations

Preview Damping Control Routine

The CPU of the ECU 30 ("CPU" hereinafter refers to the CPU of the ECU 30 unless otherwise noted) executes a preview damping control routine illustrated in a flowchart of FIG. 9 every time a predetermined period has elapsed.

Figure 9:
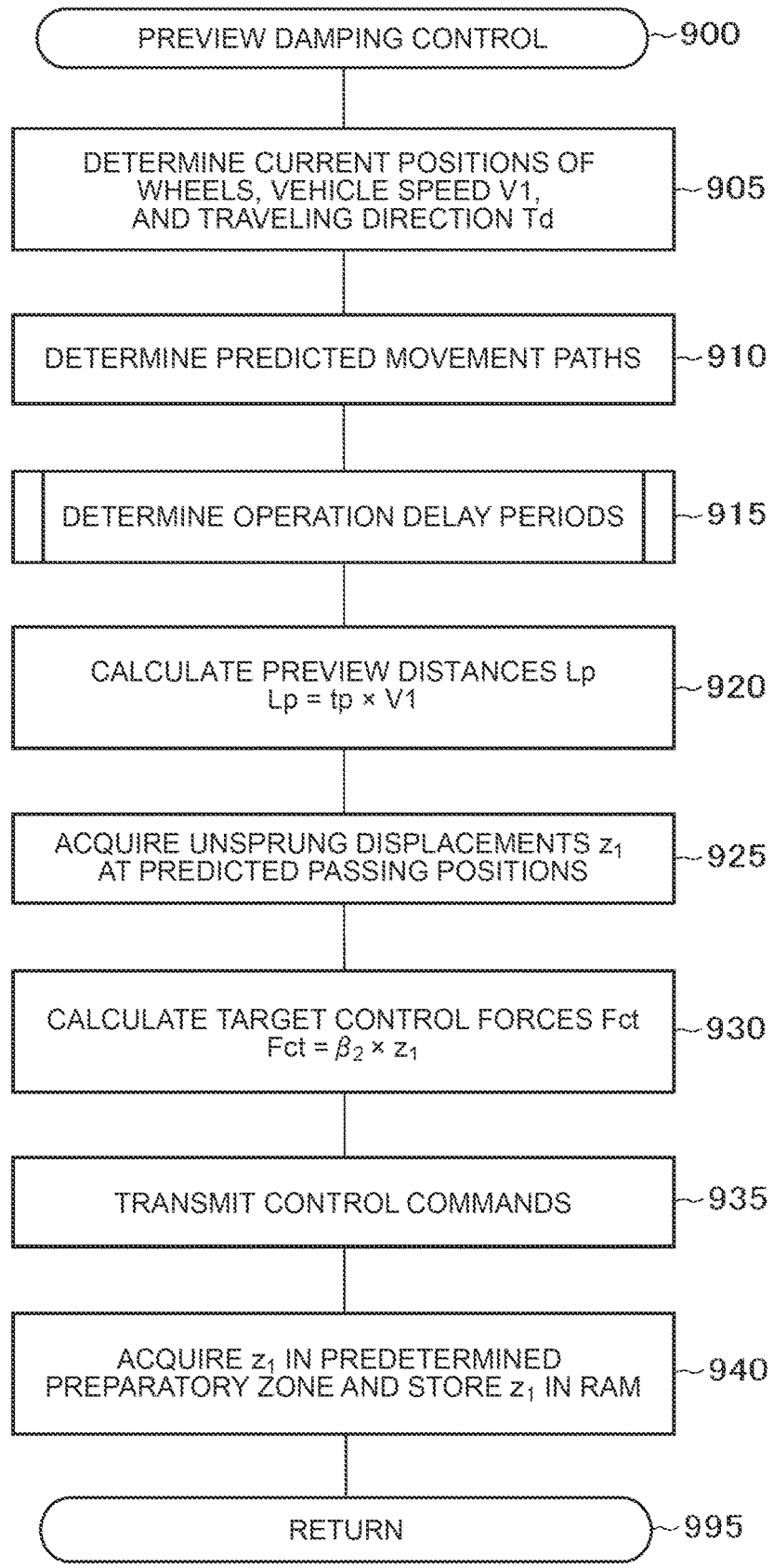
FIG. 9 is a flowchart illustrating a routine to be executed by a central processing unit (CPU) of an electronic control unit of this control device.

At a predetermined timing, the CPU starts a process from Step 900 of FIG. 9, and executes Step 905 to Step 940 in this order. Then, the CPU proceeds to Step 995 to temporarily terminate this routine.

Step 905: The CPU acquires information related to a current position of the vehicle 10 from the positional information acquiring device 31, and determines (acquires) current positions of the wheels 11, a vehicle speed V1, and a traveling direction Td of the vehicle 10.

More specifically, the CPU maps a current position in a previous case and a current position in a present case on the road map information contained in the map database, and determines, as the traveling direction Td of the vehicle 10, a direction from the current position in the previous case to the current position in the present case. The current position in the previous case means a current position of the vehicle 10 that is acquired by the CPU in Step 905 of the previously executed routine. The current position in the present case means a current position of the vehicle 10 that is acquired by the CPU in Step 905 of the present routine.

The ROM of the ECU 30 prestores positional relationship data indicating relationships between a mounting position of the GNSS receiver in the vehicle 10 and the positions of the wheels 11. The current position of the vehicle 10 that is acquired from the positional information acquiring device 31 corresponds to the mounting position of the GNSS receiver. Therefore, the CPU determines the current positions of the wheels 11 by referring to the current position of the vehicle 10, the traveling direction Td of the vehicle 10, and the positional relationship data. The GNSS signal received by the positional information acquiring device 31 contains information related to a moving speed. The CPU determines the vehicle speed V1 based on the GNSS signal.

Step 910: The CPU determines a front wheel predicted movement path and a rear wheel predicted movement path as follows. The front wheel predicted movement path is a path where the front wheel 11F is predicted to move in the future. The rear wheel predicted movement path is a path where the rear wheel 11R is predicted to move in the future. For example, the CPU determines the front wheel predicted movement path and the rear wheel predicted movement path based on the current positions of the wheels 11, the traveling direction Td of the vehicle 10, and the positional relationship data.

Step 915: The CPU executes an operation delay period determination routine for determining a front wheel operation delay period tpf and a rear wheel operation delay period tpr (operation delay periods tp). The operation delay period determination routine is described in detail with reference to FIG. 10.

Step 920: The CPU calculates a front wheel preview distance $L_{pf}$ and a rear wheel preview distance $L_{pr}$ by multiplying the front wheel operation delay period tpf and the rear wheel operation delay period tpr by the vehicle speed V1, respectively.

Step 925: The CPU acquires unsprung displacements $z_1$ at a front wheel predicted passing position pf1 and a rear wheel predicted passing position pr1 from the preview reference data 45 (see Step 940 described later) acquired in advance from the cloud 40. The front wheel predicted passing position pf1 is a position spaced away from a contact position of the front wheel 11F at a current time by the front wheel preview distance $L_{pf}$ along the front wheel predicted movement path. The rear wheel predicted passing position pr1 is a position spaced away from a contact position of the rear wheel 11R at the current time by the rear wheel preview distance $L_{pr}$ along the rear wheel predicted movement path. The unsprung displacements $z_1$ acquired in Step 925 may be referred to as "preview displacements $z_1$".

Step 930 (S930): The CPU calculates target control force Fcft of the front wheel 11F by applying the preview displacement $z_1$ of the front wheel 11F to Expression (8), and target control force Fcrt of the rear wheel 11R by applying the preview displacement $z_1$ of the rear wheel 11R to Expression (9).

Step 935 (S935): The CPU transmits a control command containing the target control force Fcft of the front wheel 11F to each front wheel active actuator 17F, and a control command containing the target control force Fcrt of the rear wheel 11R to each rear wheel active actuator 17R.

Step 940: When the front wheel predicted passing position pf1 reaches a position that is a predetermined distance back from the end point of the preparatory zone, the CPU acquires "unsprung displacements $z_1$ and pieces of positional information" in a new preparatory zone having a start point at the front wheel predicted passing position pf1 from the preview reference data 45 in the cloud 40, and stores the acquired unsprung displacements $z_1$ and the acquired pieces of positional information in the RAM. The new preparatory zone has a start point at the front wheel predicted passing position pf1 that reaches the end point of the previous preparatory zone, and has an end point at a position spaced away from the front wheel predicted passing position pf1 by a predetermined preparatory distance along the front wheel predicted movement path. The preparatory distance is preset to a value sufficiently larger than the front wheel preview distance $L_{pf}$.

The process of Step 940 is described in detail. The CPU transmits an acquisition request containing positional information of the preparatory zone to the management server 42 via the wireless communication device 32. The management server 42 acquires, from the preview reference data 45, unsprung displacements $z_1$ linked to pieces of positional information corresponding to positions in the preparatory zone contained in the acquisition request, and transmits the pieces of positional information and the unsprung displacements $z_1$ to the damping control device 20. When the damping control device 20 receives the pieces of positional information and the unsprung displacements $z_1$, the CPU stores the received pieces of positional information and the received unsprung displacements $z_1$ in the RAM.

Operation Delay Period Determination Routine

Figure 10:
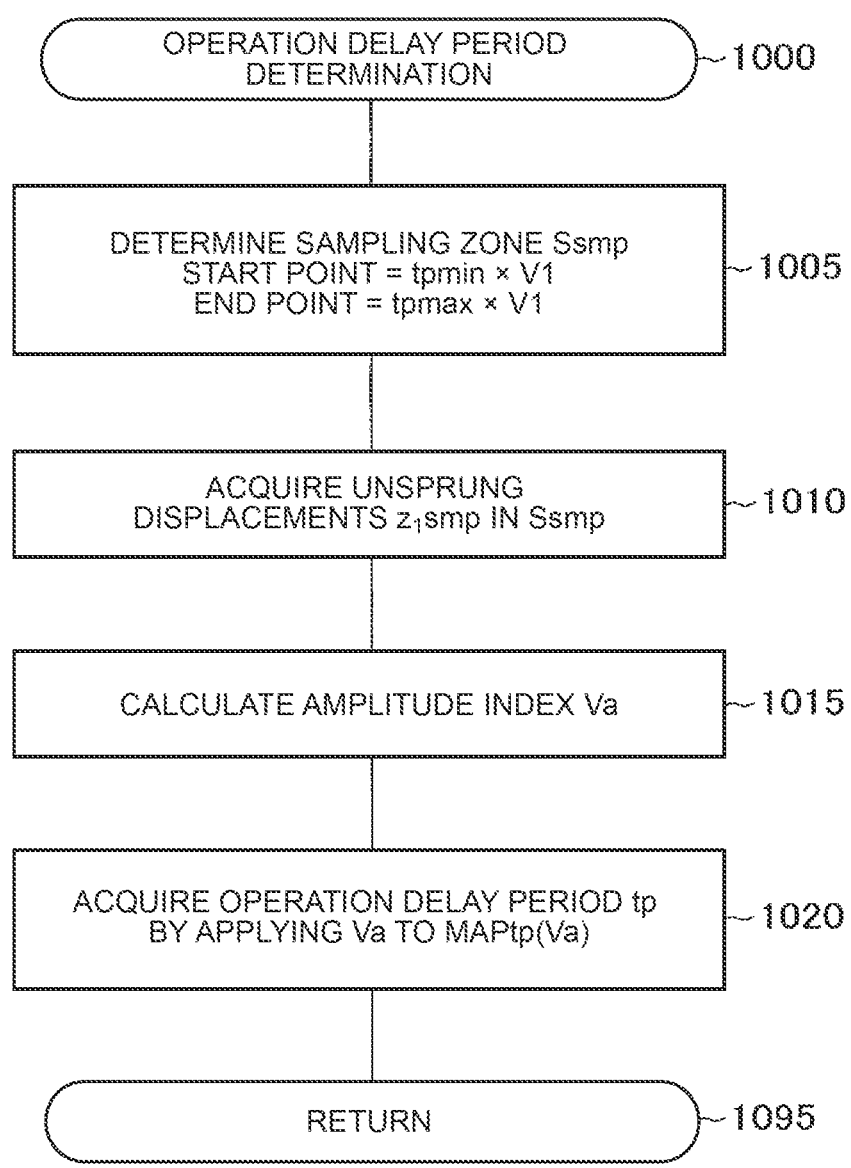
FIG. 10 is a flowchart illustrating a subroutine to be executed by the CPU in an operation delay period determination routine in the routine illustrated in FIG. 9.

When the CPU proceeds to Step 915 of FIG. 9, the CPU starts a process of the operation delay period determination routine illustrated in a flowchart of FIG. 10 from Step 1000, and executes Step 1005 to Step 1020. Then, the CPU proceeds to Step 1095 to temporarily terminate this routine, and proceeds to Step 920 of FIG. 9.

Step 1005: The CPU determines a front wheel sampling zone Ssmp and a rear wheel sampling zone Ssmp. The front wheel sampling zone Ssmp and the rear wheel sampling zone Ssmp are referred to as "sampling zones Ssmp" unless otherwise distinguished.

For example, the sampling zone Ssmp is a zone from a position spaced away from a contact position of the wheel 11 at the current time by a minimum distance Lmin (see Expression (10)) along the predicted movement path to a position spaced away from the contact position by a maximum distance Lmax (see Expression (11)) along the predicted movement path.

$$L\min = tpf\min \times V1 \tag{10}$$

$$L\max = tpf\max \times V1 \tag{11}$$

In Expression (10), tpfmin represents a preset minimum front wheel operation delay period tpf, which is obtained by adding a minimum operation delay period of the active actuator 17 to a period required for the CPU to transmit the control command (calculation period). In Expression (11), tpfmax represents a preset maximum front wheel operation delay period tpf, which is obtained by adding a maximum operation delay period of the active actuator 17 to the calculation period. Since the sampling zone Ssmp is set in this manner, the predicted passing position can securely be included in the sampling zone Ssmp.

Step 1010 (S1010): The CPU acquires unsprung displacements $z_1$ at a plurality of positions in the front wheel sampling zone Ssmp as front wheel sampled displacements $z_1$smp, and unsprung displacements $z_1$ at a plurality of positions in the rear wheel sampling zone Ssmp as rear wheel sampled displacements $z_1$smp. The front wheel sampled displacements $z_1$smp and the rear wheel sampled displacements $z_1$smp are referred to as "sampled displacements $z_1$smp" unless otherwise distinguished.

Step 1015 (S1015): The CPU calculates a front wheel amplitude index Vaf based on the front wheel sampled displacements $z_1$smp, and a rear wheel amplitude index Var based on the rear wheel sampled displacements $z_1$smp. The front wheel amplitude index Vaf and the rear wheel amplitude index Var are referred to as "amplitude indices Va" unless otherwise distinguished. The amplitude index Va indicates the magnitude of an amplitude of a road surface having the sampled displacements $z_1$smp.

For example, the CPU calculates a peak-to-peak magnitude of the sampled displacements $z_1$smp, and calculates a maximum value of the magnitude as the amplitude index Va. More specifically, the CPU determines local maximum values and local minimum values of the sampled displacements $z_1$smp, defines sets of a local maximum value and a local minimum value preceding or succeeding the local maximum value, and calculates absolute values of differences in the sets. The CPU calculates a maximum value of the absolute values of the differences as the amplitude index Va.

The method for calculating the amplitude index Va is not limited to the method in the example described above. For example, the CPU may calculate an absolute value of a difference between the maximum value and the minimum value of the sampled displacements $z_1$ as the amplitude index Va, or may calculate an average of the sampled displacements $z_1$smp as the amplitude index Va. An output value obtained by subjecting the sampled displacements $z_1$smp to low-pass filtering for passing only a frequency band equal to or lower than a predetermined cutoff frequency may be used as the average.

Step 1020 (S1020): The CPU determines a front wheel operation delay period tpf by applying the front wheel amplitude index Vaf to the front wheel operation delay period map MAPtpf(Vaf), and a rear wheel operation delay period tpr by applying the rear wheel amplitude index Var to the rear wheel operation delay period map MAPtpr(Var).

The CPU proceeds to Step 1095 to temporarily terminate this routine, and proceeds to Step 920 of FIG. 9.

As understood from the above, the operation delay period tp is determined in association with the magnitude of the amplitude of the sampled displacements $z_1$smp. Thus, the ECU 30 can predict a more accurate operation delay period tp, and cause the control force generating device 17 to generate control force Fc that agrees with the target control force Fct based on the unsprung displacement $z_1$ at the predicted passing position at a timing when the wheel 11 passes through the predicted passing position. Accordingly, the vibration of the sprung portion 51 can be reduced appropriately.

First Modified Example

In a first modified example, the sampled displacements $z_1$smp are subjected to band-pass filtering for passing only a predetermined frequency band, and the amplitude index Va is calculated based on the sampled displacements $z_1$smp subjected to the band-pass filtering. The frequency band is preset to a frequency band in which the vibration of the sprung portion 51 (vehicle body 10a) can be reduced by causing the active actuator 17 to generate the control force Fc. For example, the frequency band is 0.5 Hz to 8.0 Hz.

Figure 11:
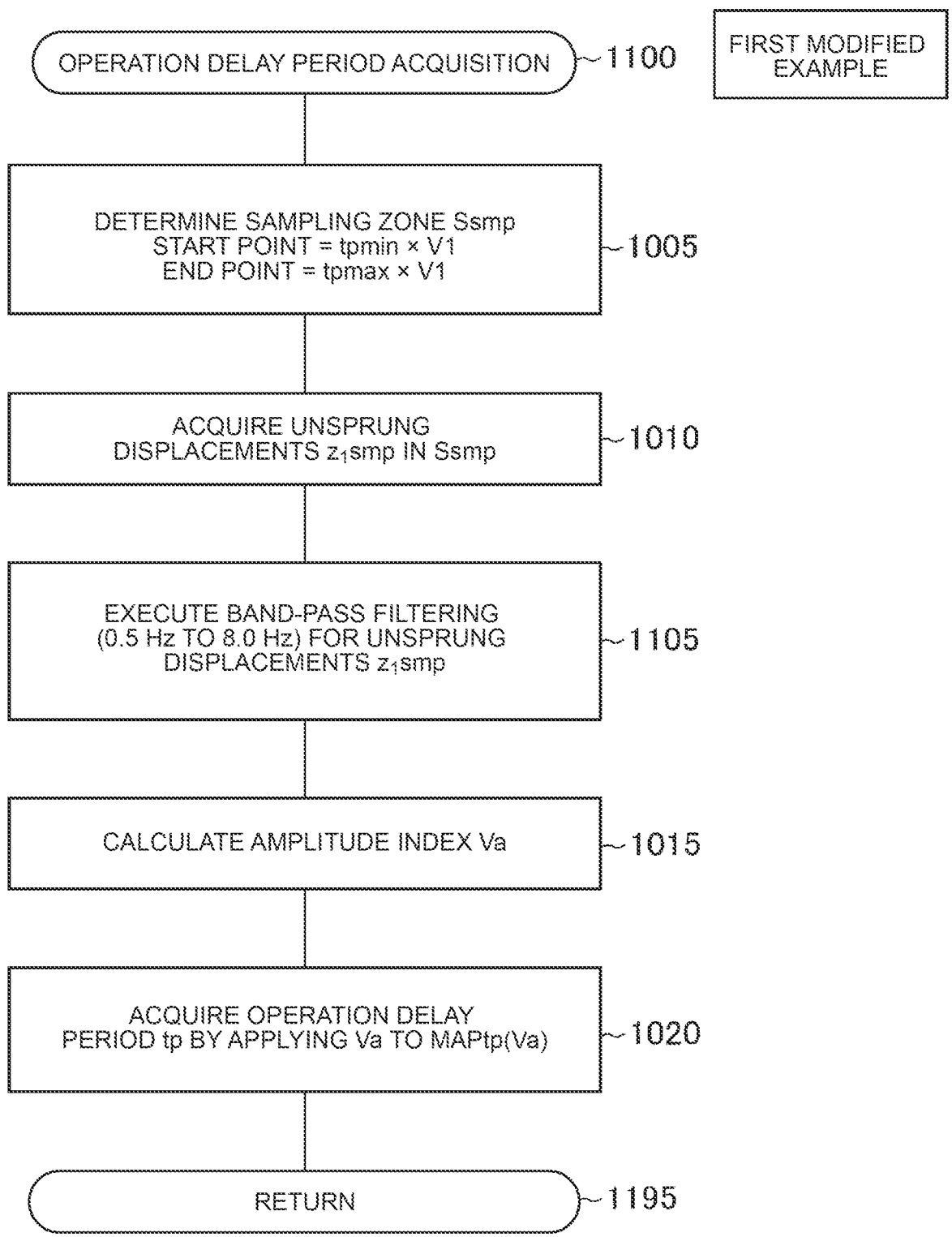
FIG. 11 is a flowchart illustrating a routine to be executed by a CPU of an electronic control unit of a preview damping control device according to a first modified example of the embodiment of the present disclosure.

When the CPU of this modified example proceeds to Step 915 of FIG. 9, the CPU starts a process of an operation delay period determination routine illustrated in a flowchart of FIG. 11 from Step 1100. In FIG. 11, the same processes as those in the flowchart of FIG. 10 are represented by the same reference symbols to omit their description.

After executing Step 1005 and Step 1010 in this order, the CPU proceeds to Step 1105 to execute the band-pass filtering for the sampled displacements $z_1$smp. In Step 1015, the CPU calculates amplitude indices Va based on the sampled displacements $z_1$smp subjected to the band-pass filtering.

The CPU executes Step 1020, and proceeds to Step 1195 to temporarily terminate this routine. Then, the CPU proceeds to Step 920 of FIG. 9.

The amplitude index Va is calculated based on the sampled displacements $z_1$smp in the frequency band controllable by the active actuator 17, and the operation delay period tp is determined based on the amplitude index Va. Thus, the ECU 30 can predict a more accurate operation delay period tp, and cause the control force generating device 17 to generate control force Fc that agrees with the target control force Fct based on the unsprung displacement $z_1$ at the predicted passing position at a timing when the wheel 11 passes through the predicted passing position. Accordingly, the vibration of the sprung portion 51 can be reduced appropriately.

Second Modified Example

In a second modified example, the CPU calculates, based on unsprung displacements $z_1$ in a first frequency band (for example, 0.5 Hz to 2.0 Hz) (first sampled displacements $z_1$smp) among unsprung displacements $z_1$ at a plurality of positions in the front wheel sampling zone Ssmp, a first amplitude index Va1 indicating the magnitude of an amplitude of the first sampled displacements $z_1$smp.

Similarly, the CPU calculates, based on unsprung displacements $z_1$ in a second frequency band (2.0 Hz to 8.0 Hz) (second sampled displacements $z_1$smp) among unsprung displacements $z_1$ at a plurality of positions in the rear wheel sampling zone Ssmp, a second amplitude index Va2 indicating the magnitude of an amplitude of the second sampled displacements $z_1$smp. The minimum frequency of the second frequency band is set to a value equal to or higher than the maximum frequency of the first frequency band.

Figure 12:
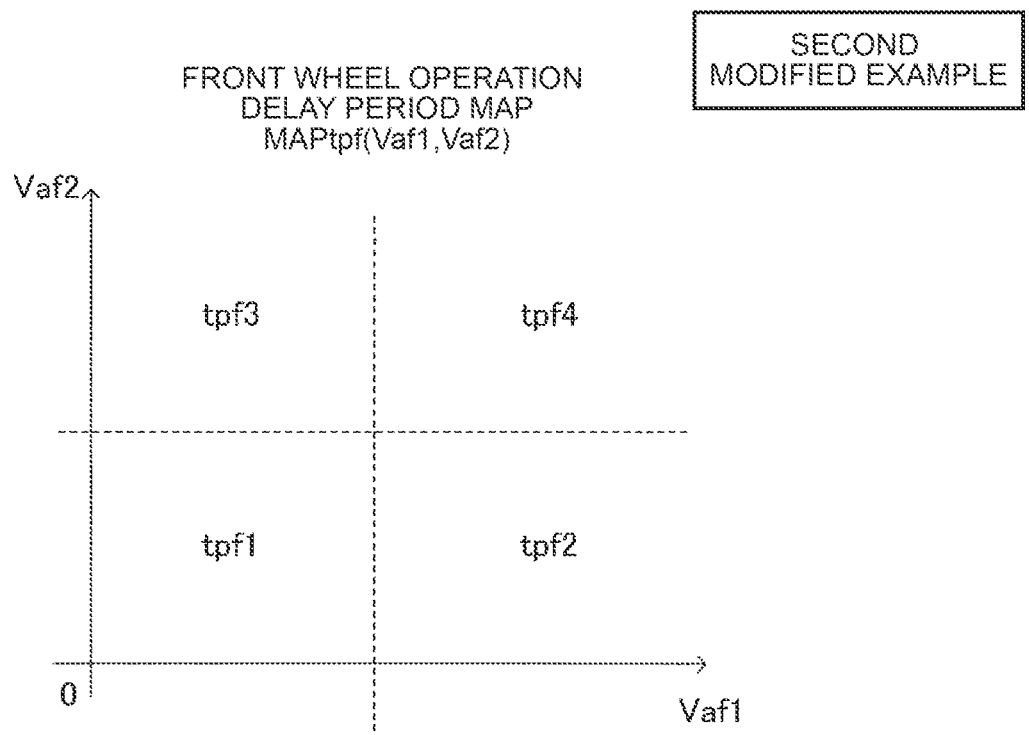
FIG. 12 is a diagram illustrating a front wheel operation delay period map according to a second modified example of the embodiment of the present disclosure.
Figure 13:
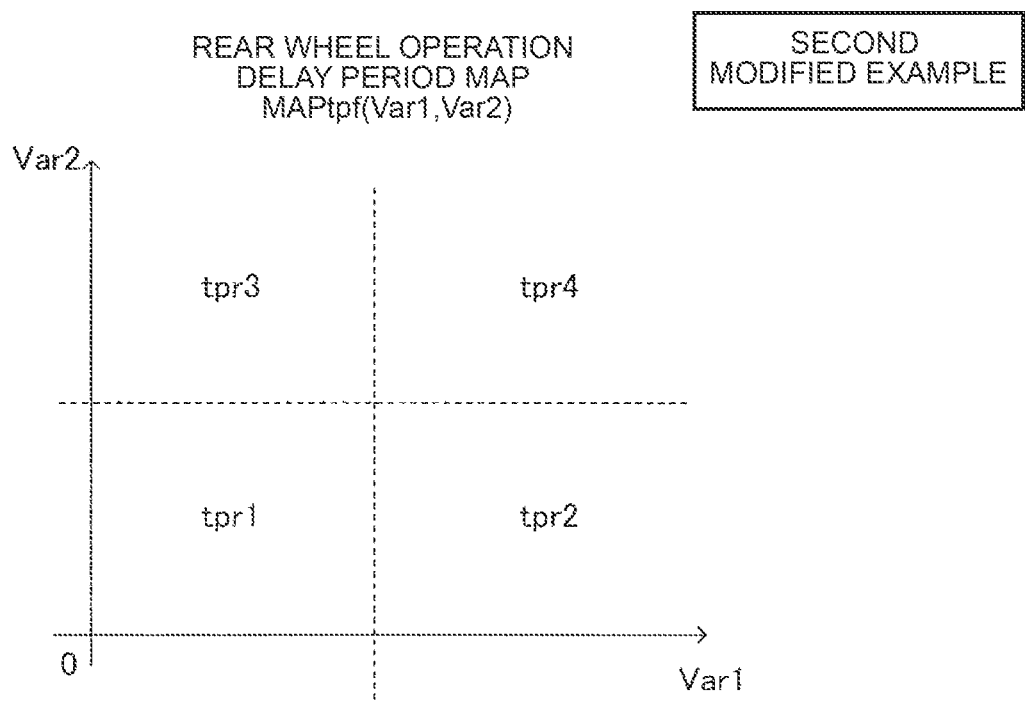
FIG. 13 is a diagram illustrating a rear wheel operation delay period map according to the second modified example of the embodiment of the present disclosure.

The CPU determines a front wheel operation delay period tpf by applying a first amplitude index Vaf1 of the front wheel 11F and a second amplitude index Vaf2 of the front wheel 11F to "front wheel operation delay period map MAPtpf(Vaf1, Vaf2) illustrated in FIG. 12". Similarly, the CPU determines a rear wheel operation delay period tpr by applying a first amplitude index Var1 of the rear wheel 11R and a second amplitude index Var2 of the rear wheel 11R to "rear wheel operation delay period map MAPtpr(Var1, Var2) illustrated in FIG. 13". The front wheel operation delay period map MAPtpf(Vaf1, Vaf2) and the rear wheel operation delay period map MAPtpr(Var1, Var2) are referred to as "operation delay period maps MAPtp(Va1, Va2)" unless otherwise distinguished.

The operation delay period map MAPtp(Va1, Va2) is prestored in the ROM of the ECU 30, and defines a relationship between the operation delay period tp and each of the first amplitude index Va1 and the second amplitude index Va2. According to the front wheel operation delay period map MAPtpf(Vaf1, Vaf2) illustrated in FIG. 12, the front wheel operation delay period tpf is defined to increase as the first amplitude index Vaf1 increases, and to increase as the second amplitude index Vaf2 increases.

More specifically, according to the front wheel operation delay period map MAPtpf(Vaf1, Vaf2), an increase amount of the front wheel operation delay period tpf through the increase in the second amplitude index Vaf2 (tpf3−tpf1, tpf4−tpf2) is defined to be larger than an increase amount of the front wheel operation delay period tpf through the increase in the first amplitude index Vaf1 (tpf2−tpf1, tpf4−tpf3). Similarly, according to the rear wheel operation delay period map MAPtpr(Var1, Var2) illustrated in FIG. 13, an increase amount of the rear wheel operation delay period tpr through the increase in the second amplitude index Var2 (tpr3−tpr1, tpr4−tpr2) is defined to be larger than an increase amount of the rear wheel operation delay period tpr through the increase in the first amplitude index Va1 (tpr2−tpr1, tpr4−tpr3).

When the amplitude of the unsprung displacements $z_1$ in the second frequency band (high frequency band) (that is, second sampled displacements $z_1$smp) is large, the possibility that the actual operation delay period of the active actuator 17 increases because the unsprung displacement $z_1$ greatly changes and the magnitude of the target control force Fct increases is stronger than the possibility when the amplitude of the unsprung displacements $z_1$ in the first frequency band (low frequency band) (that is, first sampled displacements $z_1$smp) is large. According to this modified example, the operation delay period tp can be determined more accurately because the increase amount of the operation delay period tp through the increase in the second amplitude index Va2 is larger than the increase amount of the operation delay period through the increase in the first amplitude index Va1 as described above. Thus, the control force generating device 17 can generate control force Fc that agrees with the target control force Fct based on the unsprung displacement $z_1$ at the predicted passing position at a timing when the wheel 11 passes through the predicted passing position. Accordingly, the vibration of the sprung portion 51 can be reduced appropriately.

Figure 14:
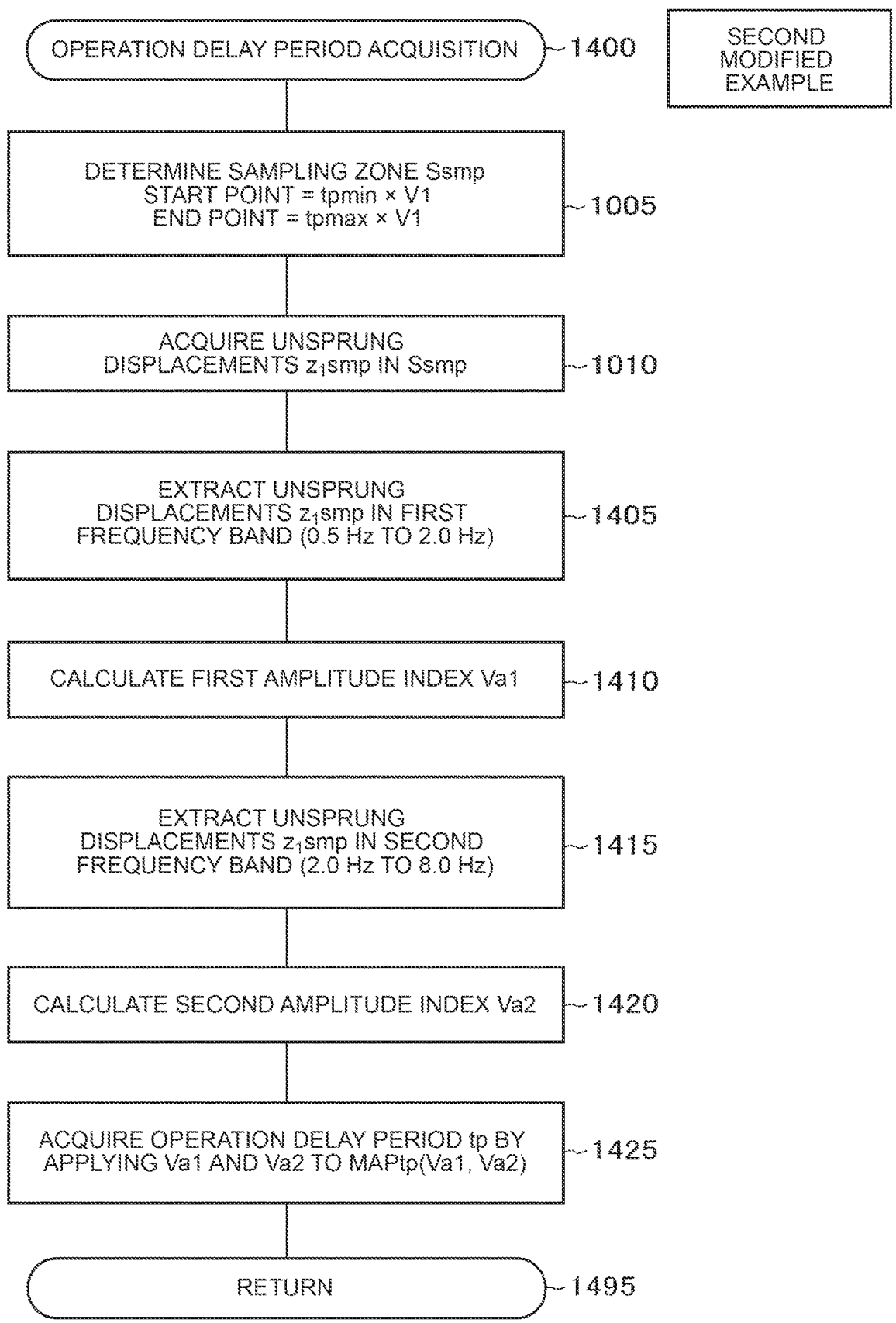
FIG. 14 is a flowchart illustrating a routine to be executed by a CPU of an electronic control unit of a preview damping control device according to the second modified example of the embodiment of the present disclosure.

When the CPU of this modified example proceeds to Step 915 of FIG. 9, the CPU starts a process of an operation delay period determination routine illustrated in a flowchart of FIG. 14 from Step 1400. In FIG. 14, the same processes as those in the flowchart of FIG. 10 are represented by the same reference symbols to omit their description. After executing Step 1005 and Step 1010 in this order, the CPU executes Step 1405 to Step 1425 in this order. The CPU proceeds to Step 1495 to temporarily terminate this routine, and proceeds to Step 920 of FIG. 9.

Step 1405: The CPU acquires first sampled displacements $z_1$smp by executing first band-pass filtering for passing only the first frequency band for unsprung displacements $z_1$ at a plurality of positions in the sampling zone Ssmp.

Step 1410: The CPU calculates a first amplitude index Va1 based on the first sampled displacements $z_1$smp. The methods for calculating the first amplitude index Va1 and the second amplitude index Va2 are the same as the method for calculating the amplitude index Va in the embodiment described above. Therefore, their description is omitted.

Step 1415: The CPU acquires second sampled displacements $z_1$smp by executing second band-pass filtering for passing only the second frequency band for unsprung displacements $z_1$ at a plurality of positions in the sampling zone Ssmp.

Step 1420: The CPU calculates a second amplitude index Va2 based on the second sampled displacements $z_1$smp.

Step 1425: The CPU determines each operation delay period tp by applying the first amplitude index Va1 and the second amplitude index Va2 to the operation delay period map MAPtp(Va1, Va2).

As understood from the above, the operation delay period tp can be determined more accurately because the increase amount of the operation delay period tp through the increase in the second amplitude index Va2 is larger than the increase amount of the operation delay period through the increase in the first amplitude index Va1. Thus, the vibration of the sprung portion 51 can be reduced appropriately.

The present disclosure is not limited to the embodiment and the modified examples described above, and various modified examples may be adopted within the scope of the present disclosure.

The embodiment and the modified examples described above are directed to the exemplary case where the present disclosure is applied to the active actuator 17 having the characteristic that the operation delay period tp increases as the magnitude of the target control force Fct increases. The present disclosure is also applicable to an active actuator 17 having a characteristic that the operation delay period tp decreases as the magnitude of the target control force Fct increases (that is, a characteristic that the operation delay period tp increases as the magnitude of the target control force Fct decreases). The active actuator 17 having this characteristic may be an actuator to be driven by a linear motor.

Figure 7:
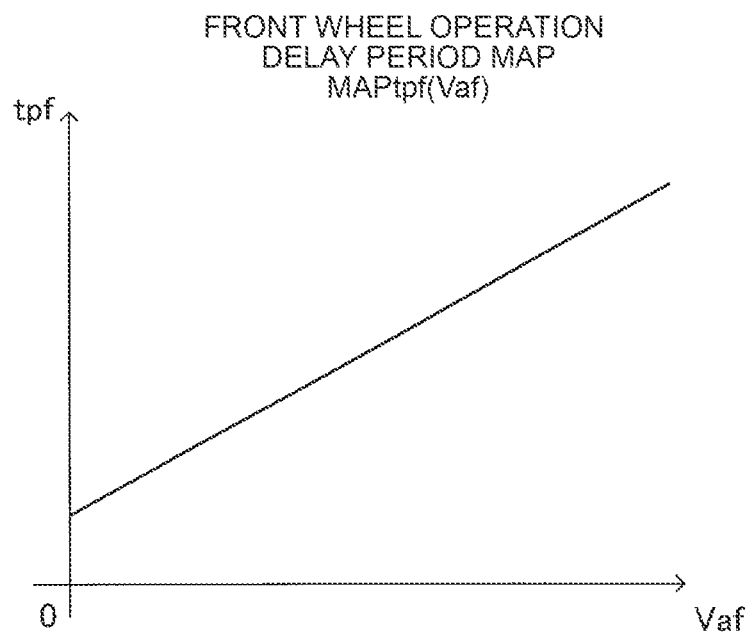
FIG. 7 is a diagram illustrating a front wheel operation delay period map.
Figure 8:
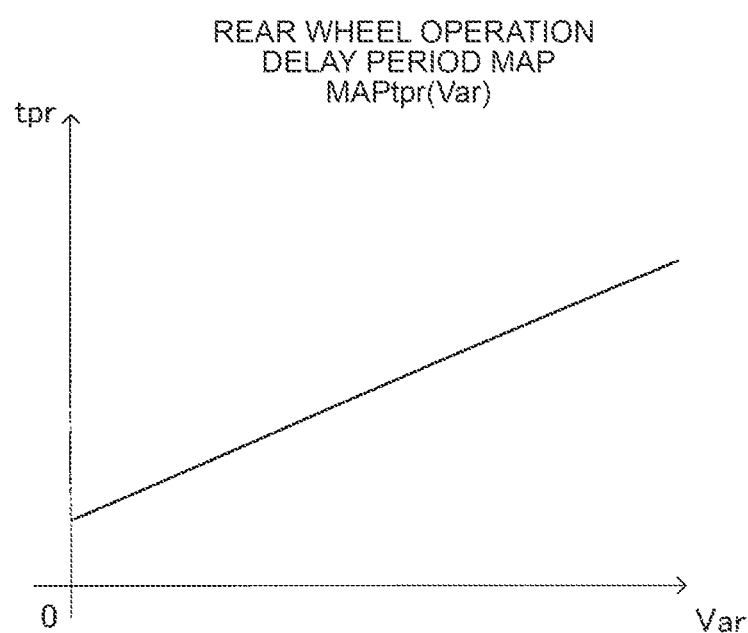
FIG. 8 is a diagram illustrating a rear wheel operation delay period map.

In this case, according to the operation delay period map MAPtp(Va) illustrated in each of FIG. 7 and FIG. 8, the operation delay period tp is defined to decrease as the amplitude index Va increases. According to the operation delay period map MAPtp(Va1, Va2) illustrated in each of FIG. 12 and FIG. 13, a decrease amount of the operation delay period tp through the increase in the second amplitude index Va2 (tp3−tp1, tp4−tp2) is set larger than a decrease amount of the operation delay period tp through the increase in the first amplitude index Va1 (tp2−tp1, tp4−tp3).

In the embodiment and the modified examples described above, the sampling zone Ssmp includes the predicted passing position of the wheel 11, but need not include the predicted passing position. That is, the end point of the sampling zone Ssmp may be a position back from the predicted passing position. The start point of the sampling zone Ssmp may be a contact position of the wheel 11 at a current time or a position back from the contact position.

The preview reference data 45 need not be stored in the storage device 44 in the cloud 40, but may be stored in the storage device 30a. In this case, the CPU may calculate unsprung displacements $z_1$ based on a vertical motion condition amount of the sprung portion 51 or the unsprung portion 50 in each wheel 11 while the vehicle 10 is traveling, and store, as the preview reference data 45, a data set in which a current position of each wheel 11 and the unsprung displacements $z_1$ of the wheel 11 are linked together. Description is omitted for the method for determining the unsprung displacement $z_1$.

When a traveling route of the vehicle 10 is determined in advance, the CPU may download preview reference data 45 of the traveling route in advance from the cloud 40 and store the preview reference data 45 in the storage device 30a before the vehicle 10 starts to travel along the traveling route.

In place of the unsprung displacement $z_1$, the unsprung speed $dz_1$ may be stored in the preview reference data 45 while being linked to the positional information. In this case, the CPU acquires an unsprung speed $dz_1$ at the predicted passing position in Step 920 of FIG. 9, and calculates an unsprung displacement $z_1$ by integrating the unsprung speed $dz_1$ in Step 925. In Step 1010 of FIG. 10, the CPU acquires unsprung speeds $dz_1$ in the sampling zone Ssmp, and calculates unsprung displacements $z_1$ in the sampling zone Ssmp by integrating the unsprung speeds $dz_1$.

The unsprung displacement $z_1$ and the unsprung speed $dz_1$ may be stored in the preview reference data 45 while being linked to the positional information. In this case, the CPU calculates the target control force Fct by using Expression (12) and Expression (13).

$$Fcft = \beta_{1f} \times dz_1 + \beta_{2f} \times z_1 \quad (12)$$

$$Fcrt = \beta_{1r} \times dz_1 + \beta_{2r} \times z_1 \quad (13)$$

The target control force Fct may be calculated by using a road surface displacement $z_0$ in place of the unsprung displacement $z_1$ and a road surface displacement speed $dz_0$ that is a time derivative of the road surface displacement $z_0$ in place of the unsprung speed $dz_1$. In this case, the road surface displacement $z_0$ may be stored in the preview reference data 45 in place of the unsprung displacement $z_1$ while being linked to the positional information, and the ECU 30 may acquire a road surface displacement $z_0$ at the predicted passing position from the preview reference data 45. Further, the ECU 30 may acquire the road surface displacement $z_0$ at the predicted passing position based on a road surface displacement $z_0$ acquired by the preview sensor 33.

The preview sensor 33 is described. For example, the preview sensor 33 is attached to an upper-end inner surface of a windshield of the vehicle 10 at the center in a vehicle width direction, and detects (acquires) a target position that is a preview distance ahead of the front wheels 11F and a road surface displacement $z_0$ around the target position. In some embodiments, the preview distance is larger than a front wheel preview distance $L_pf$ when the vehicle speed V1 of the vehicle 10 is a maximum rated vehicle speed. FIG. 2 illustrates one preview sensor 33, but a pair of preview sensors may be provided in association with the right and left front wheels.

The "unsprung displacement $z_1$ and/or unsprung speed $dz_1$ and road surface displacement $z_0$ and/or road surface displacement speed $dz_0$" that are values related to the road surface displacement $z_0$ for use in the calculation of the target control force Fct may be referred to as "road surface displacement related values".

The calculation process for the target control force Fcrt of the rear wheel 11R is not limited to that in the example described above. For example, the CPU may calculate the target control force Fcrt based on the unsprung displacement $z_1$ at the current position of the front wheel 11F at the current time tp, and transmit a control command containing the target control force Fcrt to the rear wheel active actuator 17R at a timing delayed by a period (L/V−tpr) from the current time tp. That is, the CPU may transmit the control command containing the target control force Fcrt to the rear wheel active actuator 17R at a timing when the rear wheel 11R reaches a point behind the current position of the front wheel 11F by the rear wheel preview distance $L_{pr}$. The unsprung displacement $z_1$ at the current position of the front wheel 11F may be acquired from the preview reference data 45, or may be acquired based on a sprung acceleration $ddz_2$ or an unsprung acceleration $ddz_1$ corresponding to the position of the front wheel 11F.

Another method is described next. The CPU determines, independently of the front wheel predicted movement path, a rear wheel predicted movement path based on a current position of the rear wheel 11R, a traveling direction Td of the vehicle 10, and the positional relationship data, and determines, as the rear wheel predicted passing position, a position spaced away by the rear wheel preview distance $L_{pr}$ along the rear wheel predicted movement path. The CPU acquires an unsprung displacement $z_1$ at the rear wheel predicted passing position from the preview reference data 45, and calculates the target control force Fcrt of the rear wheel 11R based on the acquired unsprung displacement $z_1$.

The vehicle speed V1 and the traveling direction Td are acquired based on the current position of the vehicle 10 that is acquired by the GNSS receiver. The present disclosure is not limited to this case. For example, the damping control device 20 may include "wheel speed sensor and steering angle sensor" (not illustrated). The wheel speed sensor may detect a rotation speed of the wheel 11, and the CPU may calculate the vehicle speed V1 based on the rotation speed of the wheel 11. A yaw rate sensor configured to detect a yaw rate of the vehicle 10 may be provided, and the CPU may acquire the traveling direction Td based on the yaw rate and the vehicle speed V1.

The suspensions 13FR to 13RL may be any type of suspension as long as the wheels 11FR to 11RL are allowed to be displaced in the vertical direction relative to the vehicle body 10a. The suspension springs 16FR to 16RL may be arbitrary springs such as compression coil springs or air springs.

In the embodiment described above, the active actuators 17FR to 17RL are provided in correspondence with the respective wheels 11, but one active actuator 17 may be provided to at least one wheel 11. For example, the vehicle 10 may have only the front wheel active actuators 17F or the rear wheel active actuators 17R.

In the embodiment and the modified examples described above, the active actuator 17 is used as the control force generating device, but the control force generating device is not limited to the active actuator 17. That is, the control force generating device may be an actuator configured to adjustably generate vertical control force for damping the sprung portion 51 based on a control command containing the target control force.

The control force generating device may be an active stabilizer device (not illustrated). The active stabilizer device includes a front wheel active stabilizer and a rear wheel active stabilizer. When the front wheel active stabilizer generates vertical control force between the sprung portion 51 and the unsprung portion 50 corresponding to the left front wheel 11FL (left front wheel control force), the front wheel active stabilizer generates control force in a direction opposite to the direction of the left front wheel control force between the sprung portion 51 and the unsprung portion 50 corresponding to the right front wheel 11FR (right front wheel control force). Similarly, when the rear wheel active stabilizer generates vertical control force between the sprung portion 51 and the unsprung portion 50 corresponding to the left rear wheel 11RL (left rear wheel control force), the rear wheel active stabilizer generates control force in a direction opposite to the direction of the left rear wheel control force between the sprung portion 51 and the unsprung portion 50 corresponding to the right rear wheel 11RR (right rear wheel control force). The structure of the active stabilizer device is incorporated herein by reference to Japanese Unexamined Patent Application Publication No. 2009-96366 (JP 2009-96366 A). The active stabilizer device may include at least one of the front wheel active stabilizer and the rear wheel active stabilizer.

The control force generating device may be a device configured to generate vertical control force Fc based on geometry of the suspensions 13FR to 13RL by increasing or reducing braking or driving force on the wheels 11 of the vehicle 10. The structure of this device is incorporated herein by reference to, for example, Japanese Unexamined Patent Application Publication No. 2016-107778 (JP 2016-107778 A). Using a predetermined method, the ECU 30 calculates braking or driving force for generating control force Fc corresponding to target control force Fct. The device includes driving devices (for example, in-wheel motors) configured to apply driving force to the wheels 11, and braking devices (brakes) configured to apply braking force to the wheels 11. The driving device may be a motor or an engine configured to apply driving force to the front wheels, the rear wheels, or the four wheels. The control force generating device may include at least one of the driving device and the braking device.

The control force generating device may be each of the adjustable shock absorbers 15FR to 15RL. In this case, the ECU 30 controls the damping coefficients C of the shock absorbers 15FR to 15RL to change damping force of the shock absorbers 15FR to 15RL by values corresponding to target control force Fct.

What is claimed is:

1. A damping control device for a vehicle, comprising:
   a control force generating device having an active actuator, the control force generating device configured to generate a control force in a vertical direction between at least one wheel suspended from a vehicle body of the vehicle and the vehicle body; and
   a controller configured to reduce, by controlling the control force generating device to change the control force, vibration of the vehicle body that is caused by vibration occurring in the at least one wheel in response to vertical road surface displacements while the vehicle is traveling, wherein
   the controller is configured to:
      acquire, as sampled values, road surface displacement related values that are values related to the vertical road surface displacements in a predetermined sampling zone;
      acquire an amplitude index indicating a magnitude of an amplitude of the sampled values;
      determine an operation delay period of the control force generating device based on the magnitude of the amplitude indicated by the amplitude index;
      calculate a target control force for reducing the vibration of the vehicle body based on the road surface displacement related values at a predicted passing position where the at least one wheel is predicted to pass after an elapse of the operation delay period from a current time; and
      transmit, to the control force generating device, a control command for causing the control force generating device to regulate the control force to agree with the target control force.

2. The damping control device according to claim 1, wherein the controller is configured to:
   determine a first local maximum value and a first local minimum value of the sampled values;
   define sets of a local maximum value and a local minimum value preceding or succeeding the first local maximum value;
   calculate an absolute value of a difference between the local maximum value and the local minimum value in each of the sets;
   determine one of the sets having a largest absolute value of the difference; and
   acquire the absolute value of the difference as the amplitude index.

3. The damping control device according to claim 1, wherein the controller is configured to acquire an average of the sampled values as the amplitude index.

4. The damping control device according to claim 1, wherein the controller is configured to acquire the amplitude index based on the sampled values in a predetermined frequency band.

5. The damping control device according to claim 4, wherein the frequency band is set to a preset frequency band in which vibration of a sprung portion is reducible by causing the control force generating device to generate the control force.

6. The damping control device according to claim 1, wherein the controller is configured to determine the operation delay period to increase as the magnitude of the amplitude indicated by the amplitude index increases.

7. The damping control device according to claim 1, wherein:
   the controller is configured to
      acquire a first amplitude index indicating a magnitude of an amplitude of the sampled values in a predetermined first frequency band,
      acquire a second amplitude index indicating a magnitude of an amplitude of the sampled values in a predetermined second frequency band having a minimum frequency equal to or higher than a maximum frequency of the first frequency band, and determine the operation delay period to increase as the magnitude of the amplitude indicated by the first amplitude index and the magnitude of the amplitude indicated by the second amplitude index increase; and an increase amount of the operation delay period that increases depending on the second amplitude index is set larger than an increase amount of the operation delay period that increases depending on the first amplitude index.

8. The damping control device according to claim 1, wherein the controller is configured to determine the operation delay period to decrease as the magnitude of the amplitude indicated by the amplitude index increases.

9. The damping control device according to claim 1, wherein:

the controller is configured to
acquire a first amplitude index indicating a magnitude of an amplitude of the sampled values in a predetermined first frequency band,
acquire a second amplitude index indicating a magnitude of an amplitude of the sampled values in a predetermined second frequency band having a minimum frequency equal to or higher than a maximum frequency of the first frequency band, and
determine the operation delay period to decrease as the magnitude of the amplitude indicated by the first amplitude index and the magnitude of the amplitude indicated by the second amplitude index increase; and a decrease amount of the operation delay period that decreases depending on the second amplitude index is set larger than a decrease amount of the operation delay period that decreases depending on the first amplitude index.

10. A damping control method for a vehicle configured to reduce, by controlling a control force generating device having an active actuator, the control force generating device to change a control force in a vertical direction, vibration of a vehicle body of the vehicle that is caused by vibration occurring in at least one wheel suspended from the vehicle body in response to vertical road surface displacements while the vehicle is traveling, the control force generating device being configured to generate the control force between the at least one wheel and the vehicle body, the damping control method comprising:

acquiring, as sampled values, road surface displacement related values that are values related to the vertical road surface displacements in a predetermined sampling zone;

acquiring an amplitude index indicating a magnitude of an amplitude of the sampled values;

determining an operation delay period of the control force generating device based on the magnitude of the amplitude indicated by the amplitude index;

calculating a target control force for reducing the vibration of the vehicle body based on the road surface displacement related values at a predicted passing position where the at least one wheel is predicted to pass after an elapse of the operation delay period from a current time; and transmitting, to the control force generating device, a control command for causing the control force generating device to regulate the control force to agree with the target control force.

* * * * *